US012766364B2

(12) United States Patent
Wehba et al.

(10) Patent No.: US 12,766,364 B2
(45) Date of Patent: Oct. 20, 2026

(54) METHODS AND SYSTEMS FOR EXERCISE RECOGNITION AND ANALYSIS

(71) Applicant: Alive Fitness LLC, Shavertown, PA (US)

(72) Inventors: Steven R. Wehba, Carlsbad, CA (US); Douglas S. Levin, San Diego, CA (US); Gerardo Martinez, San Ysidro, CA (US); Dave Vorozilchak, Shavertown, PA (US)

(73) Assignee: ALIVE FITNESS, LLC, Shavertown, PA (US)

( * ) Notice: Subject to any disclaimer, the term of this patent is extended or adjusted under 35 U.S.C. 154(b) by 0 days.

(21) Appl. No.: 17/599,485

(22) PCT Filed: Mar. 20, 2020

(86) PCT No.: PCT/US2020/023878

§ 371 (c)(1),
(2) Date: Sep. 28, 2021

(87) PCT Pub. No.: WO2020/205276

PCT Pub. Date: Oct. 8, 2020

(65) Prior Publication Data

US 2022/0176201 A1 Jun. 9, 2022

Related U.S. Application Data

(60) Provisional application No. 62/978,412, filed on Feb. 19, 2020, provisional application No. 62/825,915, filed on Mar. 29, 2019.

(51) Int. Cl.

| | |
|---|---|
| ***A63B 24/00*** | (2006.01) |
| ***A63B 71/06*** | (2006.01) |
| ***G06T 7/20*** | (2017.01) |

(52) U.S. Cl.
CPC ...... *A63B 24/0062* (2013.01); *A63B 71/0622* (2013.01); *G06T 7/20* (2013.01);
(Continued)

(58) Field of Classification Search
CPC ............ A63B 24/0062; A63B 71/0622; A63B 2024/0068; A63B 2071/0625;
(Continued)

(56) References Cited

U.S. PATENT DOCUMENTS

| | | | | |
|---|---|---|---|---|
| 2014/0031123 A1* | 1/2014 | Sarrafzadeh | A63F 13/428 | 463/36 |
| 2014/0270375 A1* | 9/2014 | Canavan | A61B 5/7246 | 382/103 |

(Continued)

FOREIGN PATENT DOCUMENTS

WO 2016146834 A1 9/2016

OTHER PUBLICATIONS

International Search Report and Written Opinion for corresponding PCT Application PCT/US2020/023878 mailed Jun. 15, 2020.

*Primary Examiner* — Michael C Grant
(74) *Attorney, Agent, or Firm* — Duane Morris LLP

(57) ABSTRACT

A method includes providing information to a user about available guided exercise routines. The method further includes receiving from the user a selection of one of the available guided exercise routines. The method further includes providing digital and audio content comprising the selected guided exercise routine to the user. The method further includes receiving motion data from a at least one motion sensor worn by the user while performing exercises associated with the selected guided exercise routine. The method further includes identifying repetitions of an exercise being performed by the user. The method further includes calculating a performance score based on the
(Continued)

motion data received from the motion sensor using a neural network trained using feedback provided by one or more expert reviewers based on review of video of one or more training users performing the exercise. The method further includes displaying the performance score on the display unit.

20 Claims, 10 Drawing Sheets

(52) U.S. Cl.
CPC ................. *A63B 2024/0068* (2013.01); *A63B 2071/0625* (2013.01); *A63B 2071/0638* (2013.01); *A63B 2214/00* (2020.08); *A63B 2220/17* (2013.01); *A63B 2220/40* (2013.01); *A63B 2220/803* (2013.01); *A63B 2225/20* (2013.01); *G06T 2207/10016* (2013.01); *G06T 2207/20081* (2013.01); *G06T 2207/20084* (2013.01); *G06T 2207/30196* (2013.01)

(58) Field of Classification Search
CPC ........ A63B 2071/0638; A63B 2214/00; A63B 2220/17; A63B 2220/40; A63B 2220/803; A63B 2225/20; G06T 7/20; G06T 2207/10016; G06T 2207/20081; G06T 2207/20084; G06T 2207/30196; A61B 5/6814; A61B 5/6831; A61B 2503/10; A61B 2505/09; A61B 2562/0219; A61B 5/0205; A61B 5/744; A61B 5/1118; A61B 5/02416; A61B 5/6823; A61B 2562/0247
USPC .......................................................... 434/236
See application file for complete search history.

(56) References Cited

U.S. PATENT DOCUMENTS

| | | | |
|---|---|---|---|
| 2015/0317515 | A1 | 11/2015 | Lake, II et al. |
| 2016/0199693 | A1 | 7/2016 | Vermilyea et al. |
| 2016/0279475 | A1 * | 9/2016 | Aragones ................. A43B 3/34 |
| 2018/0126248 | A1 | 5/2018 | Dion et al. |
| 2019/0209777 | A1 * | 7/2019 | O'Connell ......... A61B 5/14532 |
| 2019/0224528 | A1 * | 7/2019 | Omid-Zohoor ...... A61B 5/0024 |

* cited by examiner

METHODS AND SYSTEMS FOR EXERCISE RECOGNITION AND ANALYSIS

CROSS-REFERENCE TO RELATED APPLICATION

This application is a § 371 national stage entry of International Application No. PCT/US2020/023878, filed on Mar. 20, 2020, which claims priority to U.S. Provisional Patent Application Ser. No. 62/825,915, filed on Mar. 29, 2019 and U.S. Provisional Patent Application Ser. No. 62/978,412, filed on Feb. 19, 2020, the entire contents of which are incorporated herein by reference.

BACKGROUND

It is often more convenient for individuals to perform exercise routines in their own homes than for the individual to travel to a gym, yoga studio, or other fitness facility. Recorded or live streamed workouts are common, such as those produced by Beachbody, LLC, Daily Burn and others. The convenience of these at-home workouts can increase participation and, thereby, improve participants' health and wellness.

However, when performing at-home workout routines, participants do not receive the benefit of feedback from a trainer, instructor, or other fitness instructor. As a result, participants may be unsure if they are performing exercises correctly. Performing exercises with poor form can reduce the effectiveness of the exercise routine and can lead to injuries. Further, when performing exercises at home, the participant may lose the ability to compare his/her performance with others, such as is possible during in-person group exercises.

SUMMARY

In one aspect, a method includes providing information to a user about available guided exercise routines that can be accessed via a digital communication network. The method further includes receiving from the user a selection of one of the available guided exercise routines for display on a display unit of a viewing device. The method further includes providing digital and audio content comprising the selected guided exercise routine to the user via the viewing device. The method further includes receiving motion data from at least one motion sensor of a wearable device worn by the user while performing exercises associated with the selected guided exercise routine. The method further includes identifying repetitions of an exercise being performed by the user based on the motion data received from the at least one motion sensor. The method further includes calculating a performance score for the user based on the motion data received from the at least one motion sensor, wherein the performance score is calculated using a neural network trained using feedback provided by one or more expert reviewers based on review of video of one or more training users performing the exercise. The method further includes displaying the performance score on the display unit.

In another aspect, a method includes providing information to a user about available guided exercise routines that can be accessed via a digital communication network. The method further includes receiving from the user a selection of one of the available guided exercise routines for display on a display unit of a viewing device. The method further includes providing digital and audio content comprising the selected guided exercise routine to the user via the viewing device. The method further includes receiving motion data from at least one motion sensor of a wearable device worn by the user while performing exercises associated with the selected guided exercise routine. The method further includes identifying repetitions of an exercise being performed by the user based on the motion data received from the at least one motion sensor. The method further includes generating, based on the motion data received from at least one motion sensor, feedback regarding the user's performance of the exercise, wherein the feedback is determined using a neural network trained using feedback provided by the one or more expert reviewers based on review of video of one or more training user's performing the exercise. The method further includes displaying the feedback on the display unit.

In another aspect, a method includes receiving training motion data from at least one motion sensor of a wearable device worn by the user while performing an exercise. The method further includes displaying a video of the training user performing the exercise to a fitness expert. The method further includes receiving feedback from the fitness expert regarding the training user's performance of the exercise. The method further includes training a neural network with the training motion data and the feedback from the fitness expert, wherein the neural network is to be used in analyzing other users' performance of the exercise.

In another aspect, a wearable device is configured to be worn by a user while performing a guided exercise routine. The wearable device includes at least one motion sensor and a processing unit communicably coupled to the at least one motion sensor. The processor unit is operable to receive motion data from the at least one motion sensor while the user is performing exercises associated with the guided exercise routine. The processing unit is further operable to identify, using a finite state machine, repetitions of an exercise being performed by the user based on the motion data received from the at least one motion sensor.

In various embodiments, the processing unit is alternatively, or additionally, operable to identify, using a machine learning model, repetitions of an exercise being performed by the user based on the motion data received from the at least one motion sensor.

In another aspect, a wearable device is configured to be worn by a user while performing a guided exercise routine. The wearable device includes at least one motion sensor and a processing unit communicably coupled to the at least one motion sensor. The processing unit is operable to receive motion data from the at least one motion sensor while the user is performing exercises associated with the guided exercise routine. The processing unit is further operable to identify repetitions of an exercise being performed by the user based on the motion data received from the at least one motion sensor. The processing unit is further operable to calculate a performance score for the user based on the motion data received from the at least one motion sensor, wherein the performance score is calculated using a neural network trained using feedback provided by one or more expert reviewers reviewing video of one or more training users performing the exercise.

In another aspect, a method includes providing information to a user about available guided exercise routines that can be accessed via a digital communication network. The method further includes receiving from the user a selection of one of the available guided exercise routines for display on a display unit of a viewing device. The method further includes providing digital and audio content comprising the selected guided exercise routine to the user via the viewing device. The method further includes receiving motion data from at least one motion sensor of a wearable device worn by the user while performing exercises associated with the selected guided exercise routine. The method further includes identifying, using a finite state machine, repetitions of an exercise being performed by the user based on the motion data received from the at least one motion sensor.

In various embodiments, the method alternatively, or additionally, includes identifying, using a machine learning model, repetitions of an exercise being performed by the user based on the motion data received from the at least one motion sensor.

BRIEF DESCRIPTION OF THE DRAWINGS

The features of the embodiments described herein will be more fully disclosed in the following detailed description, which is to be considered together with the accompanying drawings wherein like numbers refer to like parts.

DETAILED DESCRIPTION

The present description relates to methods and systems of recognizing and analyzing exercises being performed by a user. In various embodiments, a digital platform of exercise analysis technology engages users performing various exercise routines (e.g., full body, free weight, interval, and resistance workouts) with audio and video guided fitness instruction and real-time performance feedback.

Exemplary Computing Environments

Figure 1:
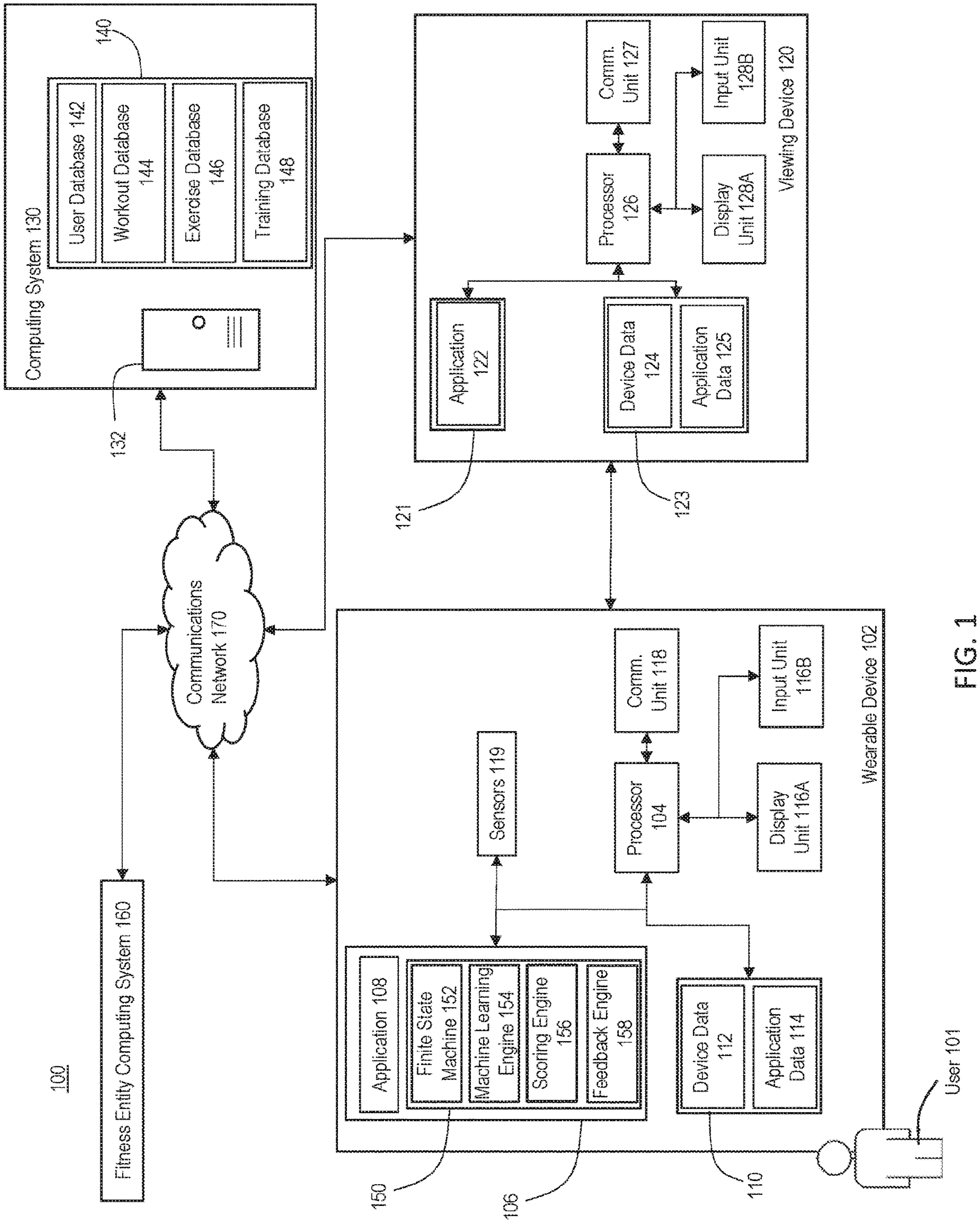
FIG. 1 is a block diagram of an exemplary computing environment, in accordance with some embodiments.

FIG. 1 is a diagram illustrating an exemplary computing environment 100 that includes a wearable device 102, a viewing device 120, and a computing system 130, each of which are operatively connected to communications network 170. The computing environment 100 can further include various third-party computing systems, such as fitness entity computing system 160. Examples of network 170 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some embodiments, each of wearable device 102, viewing device 120, computing system 130, and fitness entity computing system 160 are directly connected to communications network 170. In other embodiments, one or more of the above may be indirectly connected to communications network 170. For example, in one embodiment, wearable device 102 is indirectly connected to communications network 170 via viewing device 120 (e.g., wearable device 102 and viewing device 120 are connected via Bluetooth connection). Computing environment 100 may include additional devices, such as one or more additional wearable devices 102, and additional network-connected computing systems.

In some embodiments, wearable device 102 may include a computing device having one or more tangible, non-transitory memories that store data and/or software instructions, such as application repository 106, and one or more processors, such as processor 104, configured to execute the software instructions. The one or more tangible, non-transitory memories may, in some examples, store application programs, application modules, and other elements of code executable by the one or more processors. For example, as illustrated in FIG. 1, wearable device 102 may maintain, within application repository 106, an executable application such as application 108. Application 108 may be associated with, for example, a health and fitness entity. Such health and fitness entities may include, for example, fitness companies (such as Peloton, BeachBody, Daily Burn, etc.), a gym (e.g., Gold's Gym, Planet Fitness, LA Fitness, etc.), or a fitness trainer. Application 108 may be provisioned to wearable device 102 by computing system 130 or one of the third-party computing systems (e.g., fitness entity computing system 160). In some embodiments, upon execution, application 108 may perform one or more operations that, for example, allow user 101 to select a guided workout from a group of available workouts. As will be described in further detail herein, during performance of the selected workout, application 108 may provide feedback and/or guidance regarding the user's performance of the exercises included in the workout. This feedback and/or guidance may be in the form of visual displays, audio guidance/feedback, haptic guidance/feedback, or any other appropriate type of feedback. For example, in some embodiments, application 108 causes a performance score to be displayed on display unit 116A (described herein) indicating a relative accuracy of the user's performance of the exercise. Additionally, or alternatively, application 108 may cause wearable device 102 to vibrate a predetermined number of times or for a predetermined duration when the user is performing the exercise with proper form and for a different number of times or for a different duration when the user is not performing the exercise with proper form.

Wearable device 102 may also maintain, within the one or more tangible, non-transitory memories, one or more executable programs 150 associated with application 108, such as, but not limited to, a finite state machine 152 and a machine learning engine 154. When executed by wearable device 102 (e.g., by the one or more processors of wearable device 102), finite state machine 152 can perform operations that access workout database 144 (described further herein) to determine an exercise that a user is expected to perform. This may be based, for example, on a pre-defined workout provided by a health and fitness entity. Finite state machine 152 may further analyze data received from wearable device 102 to determine whether the user (e.g., user 101) is performing the expected exercise and further to analyze the user's form by comparing the received data against the expected or reference outputs stored in exercise database 146 of computing system 130 (described further herein).

Further, when executed by wearable device 102, machine learning engine 154 may perform one or more algorithms to, by itself or in conjunction with finite state machine 152, analyze a user's performance of an exercise. In various embodiments, both finite state machine 152 and machine learning engine 154 are used together to identify and analyze data received from wearable devices worn by the user (e.g., wearable device 102) while performing a workout. Examples of these machine learning algorithms, include, but are not limited to, a linear regression algorithm, a logistic algorithm, a Naive Bayes algorithm, a clustering algorithm or unsupervised learning algorithm (e.g., a k-means algorithm, a mixture model, a hierarchical clustering algorithm, etc.), a semi-supervised learning algorithm, a decision-tree algorithm, a cross correlation algorithm with matched filters, a nearest neighbor algorithm together with a cross-correlation, or a convolutional neural network.

Certain of these exemplary machine learning processes can be trained against, and adaptively improved using, training data having a specified composition, which may be extracted from portions of user database 142, workout database 144, and/or exercise database 146 (described further herein), and can be deemed successfully trained and ready for deployment when a model accuracy (e.g., as established based on a comparison with the outcome data), exceeds a threshold value.

Application repository 106 may further include a scoring engine 156 and a feedback engine 158. Scoring engine 156 may be configured to receive data from finite state machine 152 and machine learning engine 154 and, based on the received data, calculate a metric indicative of the user's form and performance of a particular exercise and/or the workout as a whole.

For example, in some embodiments, the user's performance of an exercise is analyzed (i.e., judged) using an artificial neural network that is established based on expert reviewers' (e.g., a fitness trainer) analysis of the same or other user's prior performance of an exercise. For example, a training user can perform a specific exercise while wearing a wearable device having one or more motion sensors. An expert reviewer can watch the training user perform the exercise (either in person, via live stream, or via a recording) and provide analysis of the training user's performance of the exercise (e.g., the training user's form while performing the exercise). In circumstances when the expert reviewer reviews a recorded video, the video can be pre-segmented (e.g., at a frame-by-frame level) such that the portions of the video corresponding to each repetition are known. This may allow the information provided by the expert reviewer to be matched up with a specific repetition performed by the user. The information provided by the expert reviewer can be associated with the motion data collected by the motion sensors (e.g., in an artificial neural network training database 148 of computing system 130). For example, when performing a squat, a training user may bend excessively at her waist. The expert reviewer notes the excessive bending (e.g., by providing input via a computing device) and this analysis may be associated with the motion data in one or more databases. Further, the expert reviewer may provide a grade (e.g., B+) or score (e.g., on a scale of 1-10 or 1-100). The feedback and grading/scoring, along with the motion data, may serve as training data for training an artificial neural network for scoring or providing feedback to subsequent user's performing the exercise. Such a process may be performed using motion data collected from many users and multiple expert reviewers. After sufficient training data is provided, the artificial neural network can provide accurate and useful feedback to user's regarding their performance of exercises. It should be understood that the scoring or advising of the exercises may be performed by a processor of the wearable device 102 (e.g., processor 104), a processor of the viewing device 120, or, alternatively, can be performed by a processor of the computing system 130. The artificial neural network can be further trained and refined by having expert reviewers analyze user performance on an ongoing basis. In other words, users who receive feedback or scoring/grading based on the user's performance of an exercise can also be reviewed by an expert reviewer and the expert reviewer's analysis of the user's performance can be used to further train and refine the artificial neural network.

Feedback engine 158 may be configured to receive data from finite state machine 152 machine learning engine 154, and scoring engine 156 to determine what, if any, feedback to provide to the user. This may include, for example, directions on how the user may improve his/her form or performance or confirmation that the user is performing the exercise correctly. The feedback may be generated using an artificial neural network, as described above, to determine appropriate feedback for the user. As noted above, although illustrated in FIG. 1 as being performed locally on wearable device 102, it should be understood that the appropriate feedback can be determined by a processor of viewing device 120 or computing system 130.

Although finite state machine 152, machine learning engine 154, scoring engine 156, and feedback engine 158 are illustrated herein as portions of application repository 106 of wearable device 102. Other configurations are within the scope of this disclosure. For example, these application programs may be stored in, and operated by, viewing device 120 or computing system 130. In such embodiments, data from sensors 119 may be transferred to viewing device 120 and/or computing system 130 to perform the operations described herein.

Application repository 106 may also include additional executable applications, such as one or more executable web browsers (e.g., Google Chrome™), for example. The disclosed embodiments, however, are not limited to these exemplary application programs, and in other examples, application repository 106 may include any additional or alternate application programs, application modules, or other elements of code executable by wearable device 102.

Wearable device 102 may also establish and maintain, within the one or more tangible, non-transitory memories, one or more structured or unstructured data repositories or databases. For example, data repository 110 may include device data 112 and application data 114. Device data 112 may include information that uniquely identifies wearable device 102, such as a media access control (MAC) address of wearable device 102 or an Internet Protocol (IP) address assigned to wearable device 102.

Application data 114 may include information that facilitates, or supports, an execution of any of the application programs described herein, such as, but not limited to, supporting information that enables executable application 108 to authenticate an identity of a user operating wearable device 102, such as user 101. Examples of this supporting information include, but are not limited to, one or more alphanumeric login or authentication credentials assigned to user 101, for example, by computing system 130, or one or more biometric credentials of user 101, such as fingerprint data or a digital image of a portion of user 101's face, or other information facilitating a biometric or multi-factor authentication of user 101. Further, in some instances, application data 114 may include additional information that uniquely identifies one or more of the exemplary application programs described herein, such as a cryptogram associated with application 108. In addition, application data 114 may include data from sensors 119 as well as portions of data from workout database 144 and/or exercise database 146.

As noted above, in some examples, wearable device 102 may include a display unit 116A configured to present elements to user 101, and an input unit 116B configured to receive input from a user of wearable device 102, such as user 101. For example, user 101 may provide input in response to prompts presented through display unit 116A. By way of example, display unit 116A may include, but is not limited to, an LCD display unit, an LED display unit, a plasma display unit, an OLED display unit, or other appropriate type of display unit, and input unit 116B may include, but is not limited to, a touchscreen, fingerprint scanner, voice activated control technologies, stylus, or any other appropriate type of input unit.

Further, in some examples, the functionalities of display unit 116A and input unit 116B may be combined into a single device, such as a pressure-sensitive touchscreen display unit that can present elements (e.g., graphical user interface) and can detect an input from user 101 via a physical touch.

Wearable device 102 may also include a communications unit 118, such as a wireless transceiver device, coupled to processor 104. Communications unit 118 may be configured by processor 104, and can establish and maintain communications with communications network 170 via a communications protocol, such as WiFi®, Bluetooth®, NFC, a cellular communications protocol (e.g., LTE®, CDMA®, GSM®, etc.), or any other suitable communications protocol. In some embodiments, the wearable device 102 connects directly to the viewing device 120 via a Bluetooth connection.

Further, wearable device 102 may also include one or more sensors, such as sensor 119. The one or more sensors can include, for example, accelerometers and gyroscopes. As will be described herein, the data gathered by the sensors are used to recognize when user 101 is performing a specific exercise and also to analyze user 101's performance of the exercise. This allows the systems described herein to provide feedback to the user regarding his or her performance of the exercise (e.g., to perform certain movements more slowly or more rapidly). The wearable device 102 can include multiple motion sensors aligned along multiple axes to more fully characterize the motion of the user.

Examples of wearable device 102 may include, but are not limited to, a smart watch, a wearable activity monitor, wearable smart jewelry, an embedded computing device (e.g., in communication with a smart textile or electronic fabric), and any other type of wearable device that may be configured to capture motion data of the user, consistent with disclosed embodiments. In some instances, user 101 may operate wearable device 102 and may do so to cause wearable device 102 to perform one or more operations consistent with the disclosed embodiments. In some embodiments, user 101, during performance of the workout, wears multiple wearable devices with motion/rotation sensors. Each providing input used in the processes described herein.

In some embodiments, viewing device 120 may include a computing device having one or more tangible, non-transitory memories that store data and/or software instructions, such as application repository 121, and one or more processors, such as processor 126, configured to execute the software instructions. The one or more tangible, non-transitory memories may, in some examples, store application programs, application modules, and other elements of code executable by the one or more processors. For example, as illustrated in FIG. 1, viewing device 120 may maintain, within application repository 121, an executable application such as application 122. Application 122 may be associated with, for example, the same health and fitness entity as application 108. Application 122 may be provisioned to viewing device 120 by computing system 130, and in some instances (upon execution), may perform operations that display a guided workout to the user (e.g., user 101), as shown, for example in FIG. 2. In some embodiments, the workout is pre-recorded. In other embodiments, the workout is live streamed.

Application repository 121 may also include additional executable applications, such as one or more executable web browsers (e.g., Google Chrome™), for example. The disclosed embodiments, however, are not limited to these exemplary application programs, and in other examples, application repository 121 may include any additional or alternate application programs, application modules, or other elements of code executable by viewing device 120.

Viewing device 120 may also establish and maintain, within the one or more tangible, non-transitory memories, one or more structured or unstructured data repositories or databases. For example, data repository 123 may include device data 124 and application data 125. Device data 124 may include information that uniquely identifies viewing device 120, such as a media access control (MAC) address of viewing device 120 or an Internet Protocol (IP) address assigned to viewing device 120.

Application data 125 may include information that facilitates, or supports, an execution of any of the application programs described herein, such as, but not limited to, supporting information that enables executable application 122 to authenticate an identity of a user operating viewing device 120, such as user 101. Examples of this supporting information include, but are not limited to, one or more alphanumeric login or authentication credentials assigned to user 101, for example, by computing system 130, or one or more biometric credentials of user 101, such as fingerprint data or a digital image of a portion of user 101's face, or other information facilitating a biometric or multi-factor authentication of user 101. Further, in some instances, application data 125 may include additional information that uniquely identifies one or more of the exemplary application programs described herein, such as a cryptogram associated with application 122.

Additionally, in some examples, viewing device 120 may include a display unit 128A configured to present elements to user 101, and an input unit 128B configured to receive input from a user of viewing device 120, such as user 101. For example, user 101 may provide input in response to prompts presented through display unit 128A. By way of example, display unit 128A may include, but is not limited to, an LCD display unit, LED display unit, plasma display unit, OLED display unit, or other appropriate type of display unit, and input unit 128B may include, but is not limited to, a keypad, keyboard, touchscreen, fingerprint scanner, voice activated control technologies, stylus, remote control, or any other appropriate type of input unit.

Further, in some examples, the functionalities of display unit 128A and input unit 128B may be combined into a single device, such as a pressure-sensitive touchscreen display unit that can present elements (e.g., graphical user interface) and can detect an input from user 101 via a physical touch.

Viewing device 120 may also include a communications unit 127, such as a wireless transceiver device, coupled to processor 126. Communications unit 127 may be configured by processor 126, and can establish and maintain communications with communications network 170 via a communications protocol, such as WiFi®, Bluetooth®, NFC, a cellular communications protocol (e.g., LTE®, CDMA®, GSM®, etc.), or any other suitable communications protocol.

Examples of viewing device 120 may include, but are not limited to, a smart television, a television with a smart device connected thereto (e.g., an Apple TV, an Amazon Fire TV or Fire TV Stick, or a Google Chromecast), a personal computer, a laptop computer, a tablet computer, a notebook computer, a hand-held computer, a mobile phone, a smartphone, or a wearable computing device (e.g., a smart watch and glasses and other optical devices that include optical head-mounted displays (OHMDs)), and any other type of computing device that may be configured to store data and software instructions, execute software instructions to perform operations, and display information on display unit 128A. As described in more detail herein, the viewing device 120 may display a guided workout on the display unit 128A so that a user can follow along with the guided workout. The guided workout may be in the form of a live stream or prerecorded workout or can include a text based list of exercises and instructions.

Referring back to FIG. 1, computing system 130 may represent a computing system that includes one or more servers and tangible, non-transitory memory devices storing executable code and application modules. Further, the one or more servers may each include one or more processor-based computing devices, which may be configured to execute portions of the stored code or application modules to perform operations consistent with the disclosed embodiments. Additionally, in some instances, computing system 130 can be incorporated into a single computing system. In other instances, computing system 130 can be incorporated into multiple computing systems.

For example, computing system 130 may correspond to a distributed system that includes computing components distributed across one or more networks, such as communications network 170, or other networks, such as those provided or maintained by cloud-service providers (e.g., Google Cloud™, Microsoft Azure™, etc.). In other examples, also described herein, the distributed computing components of computing system 130 may collectively perform additional, or alternate, operations that establish an artificial neural network capable of, among other things, adaptively and dynamically processing portions of input data to identify and/or analyze the performance of an exercise. The disclosed embodiments are, however, not limited to these exemplary distributed systems, and in other instances, computing system 130 may include computing components disposed within any additional or alternate number or type of computing systems or across any appropriate network.

By way of example, computing system 130 may be associated with, or may be operated by, a health and fitness institution that provides workouts to customers, such as, but not limited to user 101. Further, and as described herein, computing system 130 may also be configured to provision one or more executable application programs to network-connected devices operated by these customers, such as, but not limited to, executable application 108 provisioned to wearable device 102 and/or executable application 122 provisioned to viewing device 120.

To facilitate a performance of these and other exemplary processes, such as those described herein, computing system 130 may maintain, within one or more tangible, non-transitory memories, one or more databases 140. For example, user database 142 may include data records that identify and characterize one or more users of computing system 130, e.g., user 101. For example, and for each of the users, the data records of user database 142 may include a corresponding user identifier (e.g., an alphanumeric login credential assigned to user 101 by computing system 130), and data that uniquely identifies one or more devices (such as wearable device 102 and/or viewing device 120) associated with or operated by that user 101 (e.g., a unique device identifier, such as an IP address, a MAC address, a mobile telephone number, etc., that identifies wearable device 102).

Further, the data records of user database 142 may also link each user identifier (and in some instances, the corresponding unique device identifier) to one or more elements of profile information corresponding to users of computing system 130, e.g., user 101. By way of example, the elements of profile information that identify and characterize each of the users of computing system 130 may include, but are not limited to, the age, height, weight, or sex of the users.

Further, user database 142 may include data records that identify and characterize one or more workouts or exercises performed by users of computing system 130, e.g., user 101. By way of example, the data records of user database 142 may include data corresponding to the number and date of workouts performed, the number of repetitions of certain exercises performed, performance metrics associated with a user's previous workouts, and other appropriate data.

Although illustrated as a single database, user database 142 (and the other databases described herein) may comprise a plurality of databases, maintained by separate entities. For example, user database 142 may include a plurality of databases each operated by one of a plurality of health and fitness entities.

Workout database 144 may include data records associated with one or more workouts saved in computing system 130. For example, a health and fitness entity—such as a gym, trainer, or online workout service—may save one or more workouts in computing system 130. These saved workouts may be accessed by end users (e.g., user 101) as they wish to perform specific workouts (e.g., via application 108). The data records associated with the workouts may include, for example, audio and video data, an ordered list of exercises, numbers of repetitions to be completed for each exercise, a time associated with each exercise, and any other appropriate information. As will be described in more detail below, this data may be used by finite state machine 152 to recognize and analyze exercises being performed by a user (e.g., user 101).

In addition, in some embodiments, the data in workout database 144 may be derived from automatic recognition of exercises being performed in a guided workout, such as a pre-recorded or live streamed instructor-led workout. For example, during a guided workout, a program may monitor the guided workout for cues indicating the exercise that the user should be performing. For example, the program may use voice recognition to monitor audio cues given by the instructor regarding an exercise to perform. Additionally, or alternatively, by using image recognition techniques, the program may recognize the movement patterns being performed by the instructor or other participants on the recording. These methods of automatically recognizing exercises being performed may simplify the use of the system for trainers.

Exercise database 146 may include data records associated with one or more individual exercises. For example, this data may include expected or reference outputs from one or more sensors of a wearable device (e.g., wearable device 102) when users are performing a specific exercise. This data may include data records for wearable devices worn on different portions of a user's anatomy. For example, the data may include expected or reference outputs from a smart watch when worn by a user performing specified exercises. Additionally, or alternatively, the data may include expected or reference outputs from a sensor attached to, or embedded in, a user's shoes when worn by a user performing specified exercises. The data stored in exercise database 146 may be used to analyze data received from wearable devices worn by users as they are performing the exercises to analyze the user's form and provide feedback to the user.

Computing environment 100 may further include one or more third-party computing systems (e.g., fitness entity computing system 160). These third-party computing systems may be able to interact with computing system 130 through an API. This may allow the provider of the third-party computing systems to make use of finite state machine 152, machine learning engine 154, scoring engine 156, and feedback engine 158 for the third party's workouts. For example, the third party may be a gym, a trainer, or an online workout service provider. The provider of the third-party computing system may retrieve exercise definitions, workout definitions, individual's performance metrics, workout history, and workout summaries from the computing system 130 (e.g., from workout database 144 and/or exercise database 146). The provider can also send exercise and workout data to the computing system 130 (e.g., to be stored in workout database 144 and/or exercise database 146). This may allow the provider to define custom workouts through a partner portal or application that provides the third-party provider with access to the databases of computing system 130.

Exemplary Computer-Implemented Processes for Recognizing and Analyzing the Performance of Exercises In various embodiments, a user (e.g., user 101) may initiate the methods described herein. The user may be wearing one or more wearable devices. For example, the user may be wearing wearable device 102. In some embodiments, the user is wearing multiple wearable devices that may communicate with one another or with viewing device 120. For example, the user may be wearing one or more of a smart watch, a heart rate monitor, and/or clothing with integrated sensors.

In order to initiate the processes described herein, the user (e.g., user 101) selects a workout from the set of workouts stored in workout database 144 of computing system 130. The user may select the workout using wearable device 102, for example via application 108. Alternatively, or additionally, the user may select the workout using viewing device 120, for example via application 122. In various embodiments, one or more lists of workouts may be presented to the user for selection. In some embodiments, one or more of the workouts are scheduled to begin at predetermined times such that multiple users may perform the workout concurrently. This may allow the users to compare their performance on a leaderboard, as described herein.

Upon selection of a workout, a guided workout may be presented to user 101 on display unit 116A of wearable device 102 and/or on display unit 128A of viewing device 120. The guided workout may be in the form of a pre-recorded instructor led video. Alternatively, the guided workout may be a live-stream instructor led workout. Alternatively, the guided workout may be a list of exercises and associated number of repetitions and/or time for performance. In embodiments, the sequence of exercises in the guided workout is pre-loaded in workout database 144. In various embodiments, the number of repetitions and/or time for performance is also stored in workout database 144.

In other embodiments, as described above, the order and timing of exercises are derived from automatic recognition of exercises being performed in a live-stream workout. For example, during a live-streamed, instructor-led workout, a program may monitor the guided workout for cues indicating the exercise that the user should be performing. For example, the program may use voice recognition techniques to monitor audio cues given by the instructor regarding an exercise to perform. Additionally, or alternatively, the program may recognize the movement patterns being performed by the instructor or other participants on the recording using image recognition techniques using image recognition techniques. The programs to recognize the exercises being performed may include, for example, machine learning algorithms.

Figure 4C:
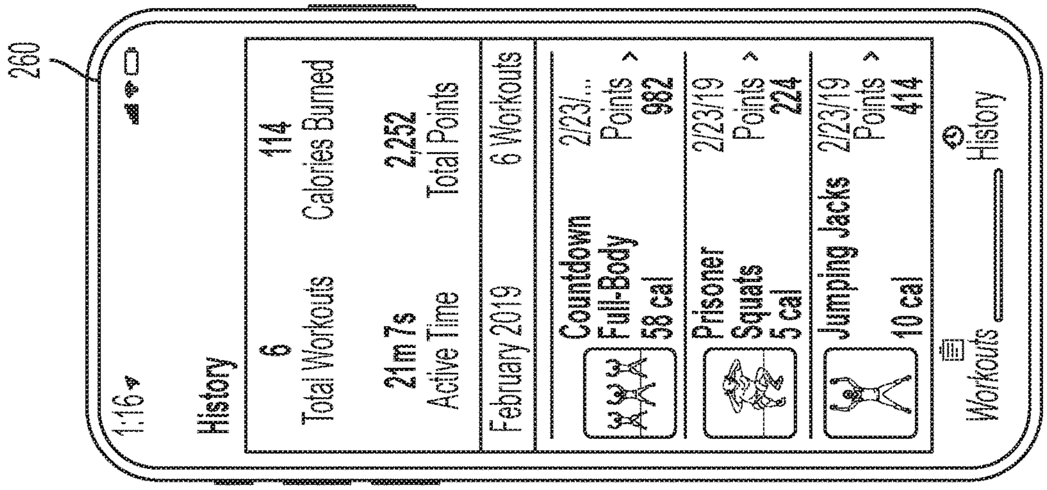
FIG. 4C is an illustration of a viewing device displaying a workout history user interface as described herein.

While performing the workout, user 101 wears one or more wearable devices. As described above, the wearable devices include one or more sensors (e.g., an accelerometer, a gyroscope, etc.). As user 101 performs the exercises associated with the guided workout, the data generated by the one or more sensors is collected, stored, and, optionally, transferred to computing system 130. This data is analyzed and, in various embodiments, real-time feedback of performance metrics and individualized training instructions are provided to the user via wearable device 102 and/or viewing device 120. Further, in some embodiments, at the completion of the workout, a workout summary and an exercise log is recorded automatically and history is stored on the wearable device, the viewing device, and/or computing system 130 for review by the user, as shown in FIGS. 4C-4E. These summaries may include, for example, the number of repetitions of each exercise performed, the number of calories burned while performing each exercise, a score for each exercise, heart rate during the performance of the exercises, etc. Cumulative information may also be provided.

Finite state machine 152 may use any of a variety of conditions to identify state transitions. For example, finite state machine 152 may use the detection of a value reaching a local minimum or maximum, detection of a slope (i.e., first-order derivative of a set of values) exceeding a minimum or maximum for a number of samples, a series of values remaining in a range or breaking out of a range for a minimum number of samples, a value crossing a threshold, one value crossing another value, or the number of samples in a state exceeding a minimum count or maximum count. Finite state machine 152 may also use, for example, inertial motion data, both raw and derived (e.g., acceleration, velocity, and position) in various frames of reference, gravity, biometric data (such as heart rate), ambient measurements (such as barometric pressure and temperature) and geolocation (GPS) to identify state transitions.

Figure 6:
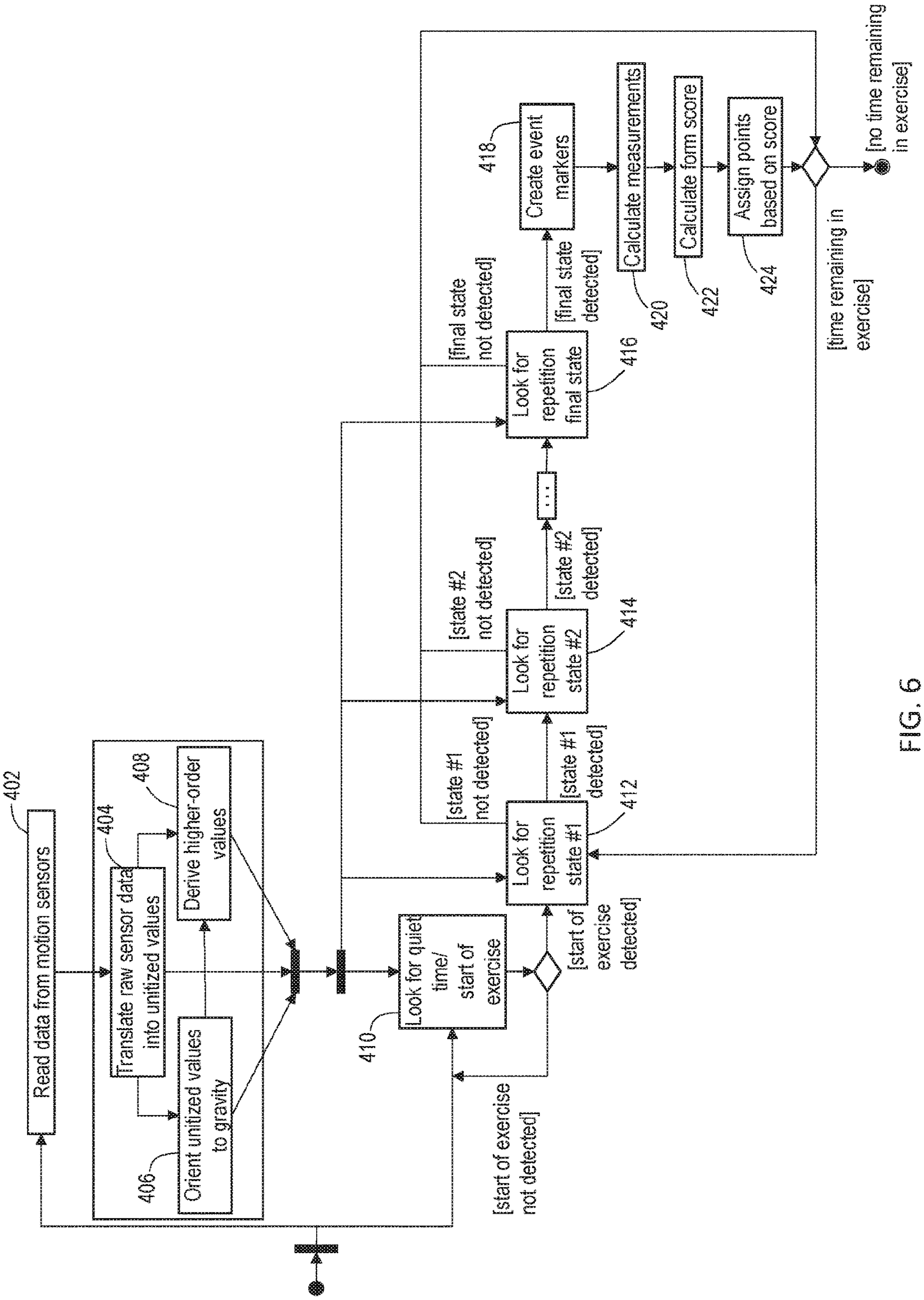
FIG. 6 is a flowchart illustrating a method of detecting repetitions of an exercise performed by a user using a finite state machine and calculating a form score, according to embodiments described herein.
Figure 8:
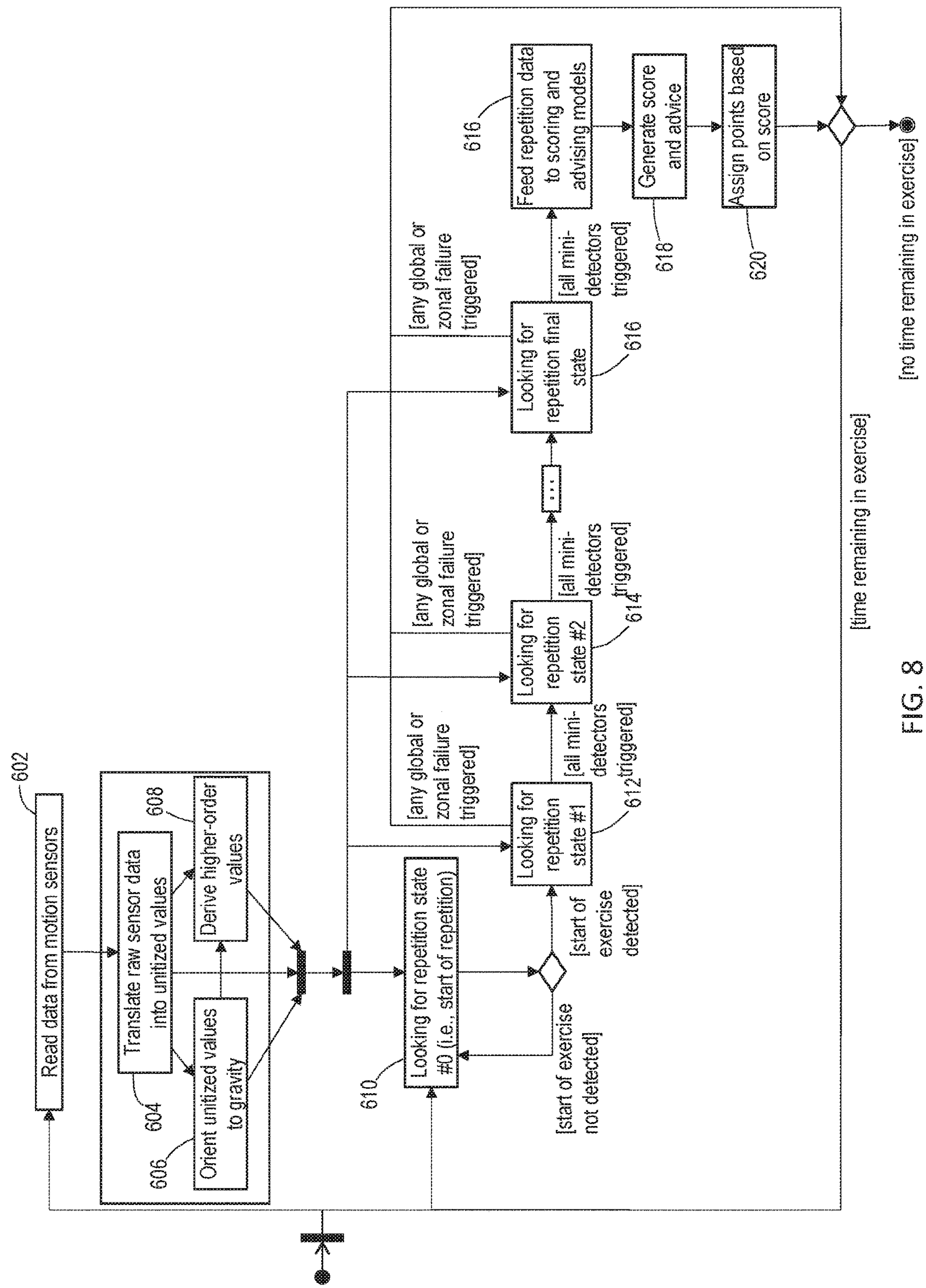
FIG. 8 is a flowchart illustrating a method of detecting repetitions of an exercise performed by a user using a finite state machine and calculating a form score, according to other embodiments described herein.

FIGS. 6 and 8 illustrate exemplary methods of detecting repetitions of an exercise. As shown, a finite state machine (e.g., finite state machine 152) reads data from the sensors of a wearable device (e.g., wearable device 102). The raw data is translated into unitized values. The oriented values are oriented to gravity and higher-order values are derived (e.g., velocity, position, slope, etc.). The finite state machine monitors the sensor data to determine when the user has begun performing an exercise, the completion of repetitions is identified by detecting a state transition, as described above. This is repeated until a final repetition state is identified. During or after completion of the exercise, measurements are performed to calculate the user's performance score (e.g., by scoring engine 156) and/or generate feedback (e.g., by feedback engine 158). This may be continued until there is no time remaining for the performance of the exercise in the workout (e.g., based on data stored in workout database 144 indicating the timing for various exercises in the workouts). The use of finite state machines to detect the performance of exercises is described in U.S. Patent Application Publication No. 2015/0100141, titled "Head Worn Sensor Device and System for Exercise Tracking and Scoring," filed on Oct. 6, 2014, the entirety of which is incorporated herein by reference.

Figure 2:
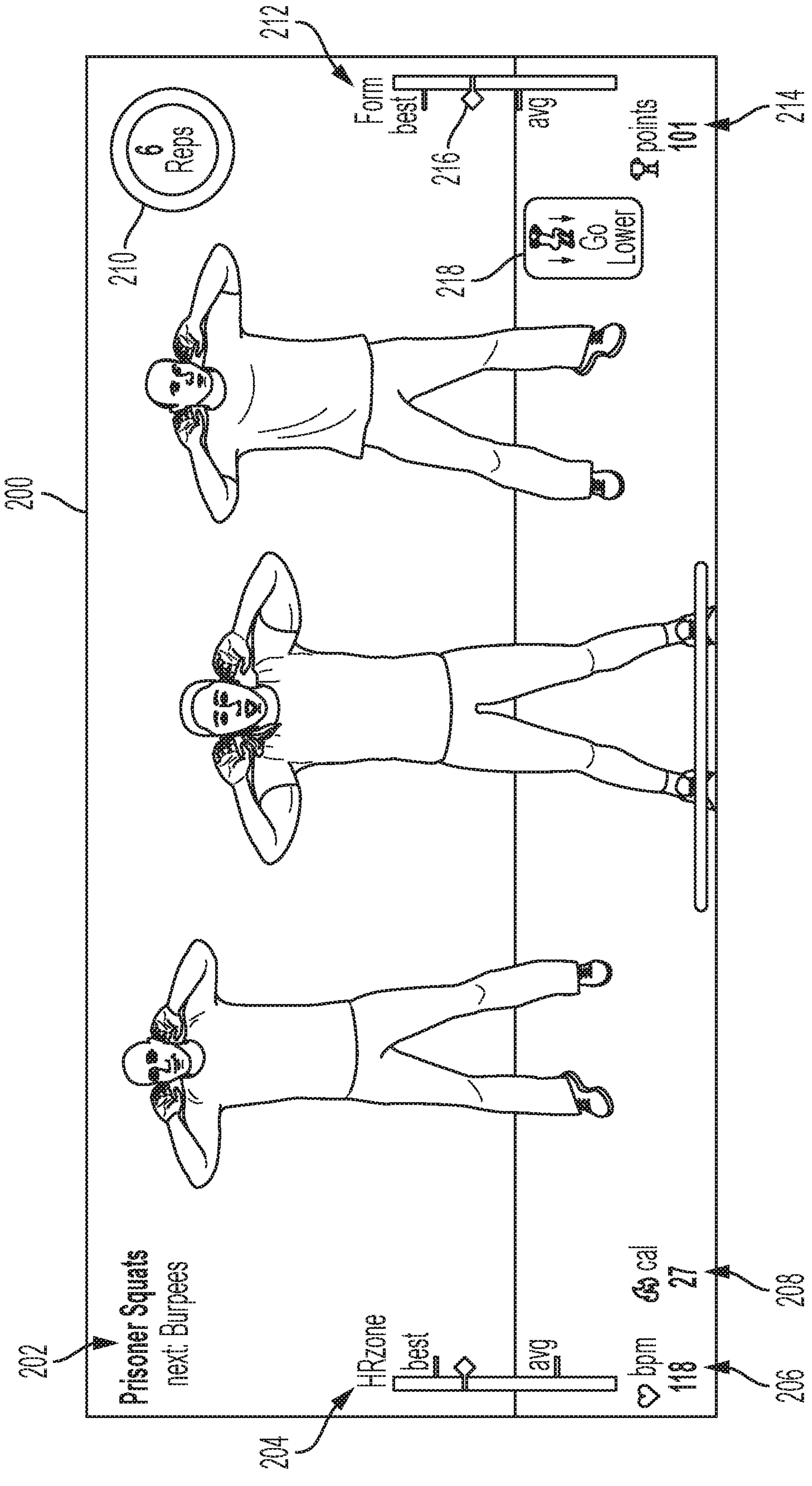
FIG. 2 is an illustration of an exemplary embodiment of a display unit displaying a guided exercise routine user interface as disclosed herein.

In various embodiments, the following information is calculated and/or generated by wearable device 102, viewing device 120, and/or computing system 130 and provided to the user (either in real-time during the performance of the exercises or after the individual exercise or workout is complete): repetition count, form analysis and scoring, performance metrics, real time, personalized audio and visual form coaching, heart rate, heart rate zone mapping, number of calories burned, form coaching and feedback, an auto-populated workout summary, a workout leaderboard comparing a user's performance to that of other users, and/or automatic workout history and tracking. Certain of this information is illustrated in FIGS. 2-4, as described in further detail below.

This information may be calculated by finite state machine 152 and/or machine learning engine 154, in each case working alone or in combination with the other, along with scoring engine 156 and feedback engine 158. Because the user is performing a guided workout, and the order of exercises composing that workout are stored in workout database 144, finite state machine 152 is able to more easily identify the exercise being performed by user 101. This is because each exercise is associated with specific signatures of movement as reflected in data collected by sensors 119. These signatures are stored in exercise database 146 that is accessible by finite state machine 152 to compare the data received from sensors 119 to the signatures stored in exercise database 146 to verify that the user is performing the expected exercise (based on the predefined workout).

Use of finite state machine 152 allows for the analysis of more detailed information about the exercise movement. This includes time ratios, velocities, accelerations, and rotations. Using this information, wearable device 102, viewing device 120, and/or computing system 130 (e.g., scoring engine 156 and feedback engine 158) can more accurately score the user's form and provide training feedback to help the user improve their performance of the exercise.

Figure 5:
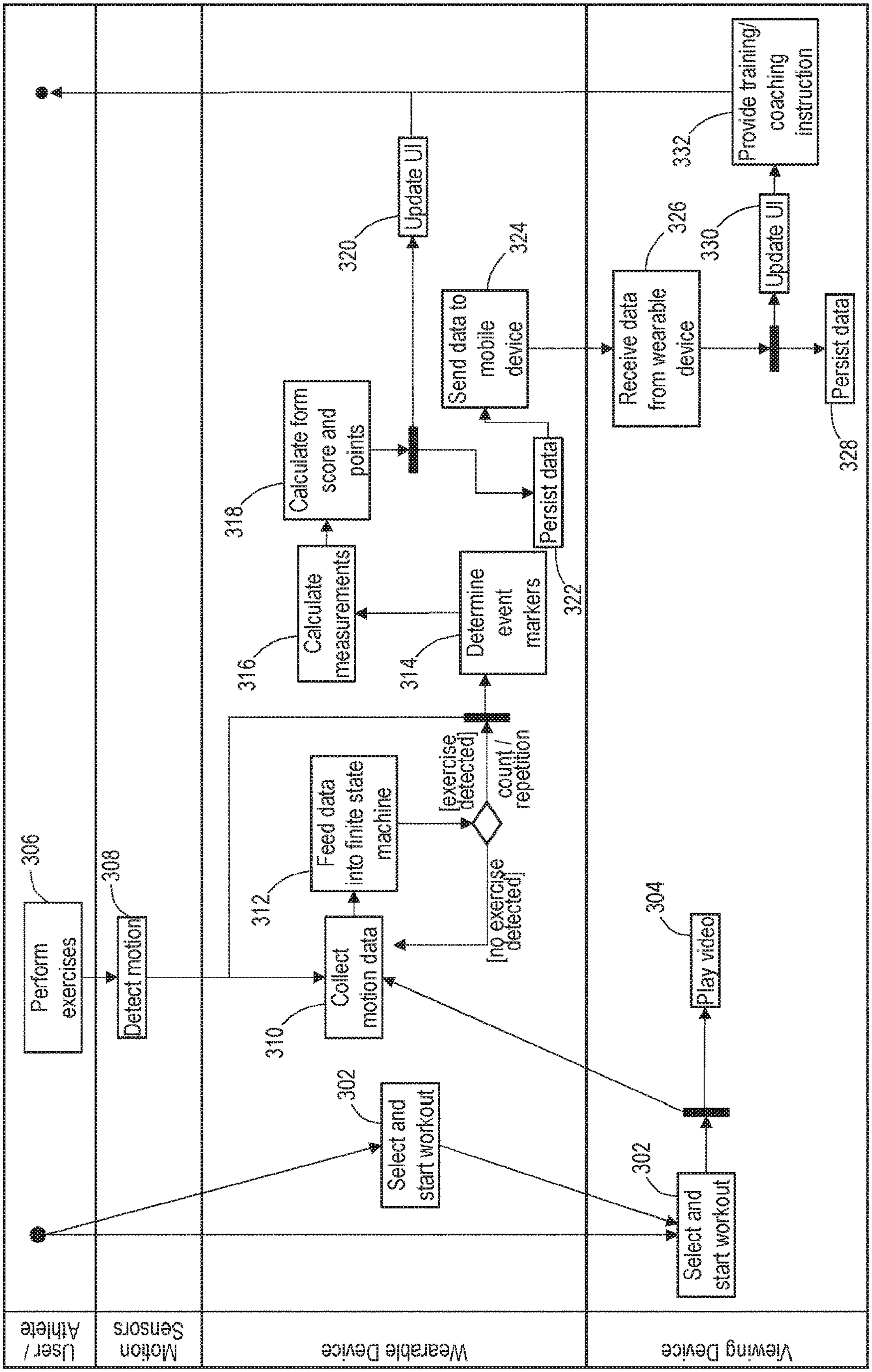
FIG. 5 is a flowchart illustrating a method of detecting repetitions of an exercise performed by a user and providing scoring and feedback to the user, according to embodiments described herein.
Figure 7:
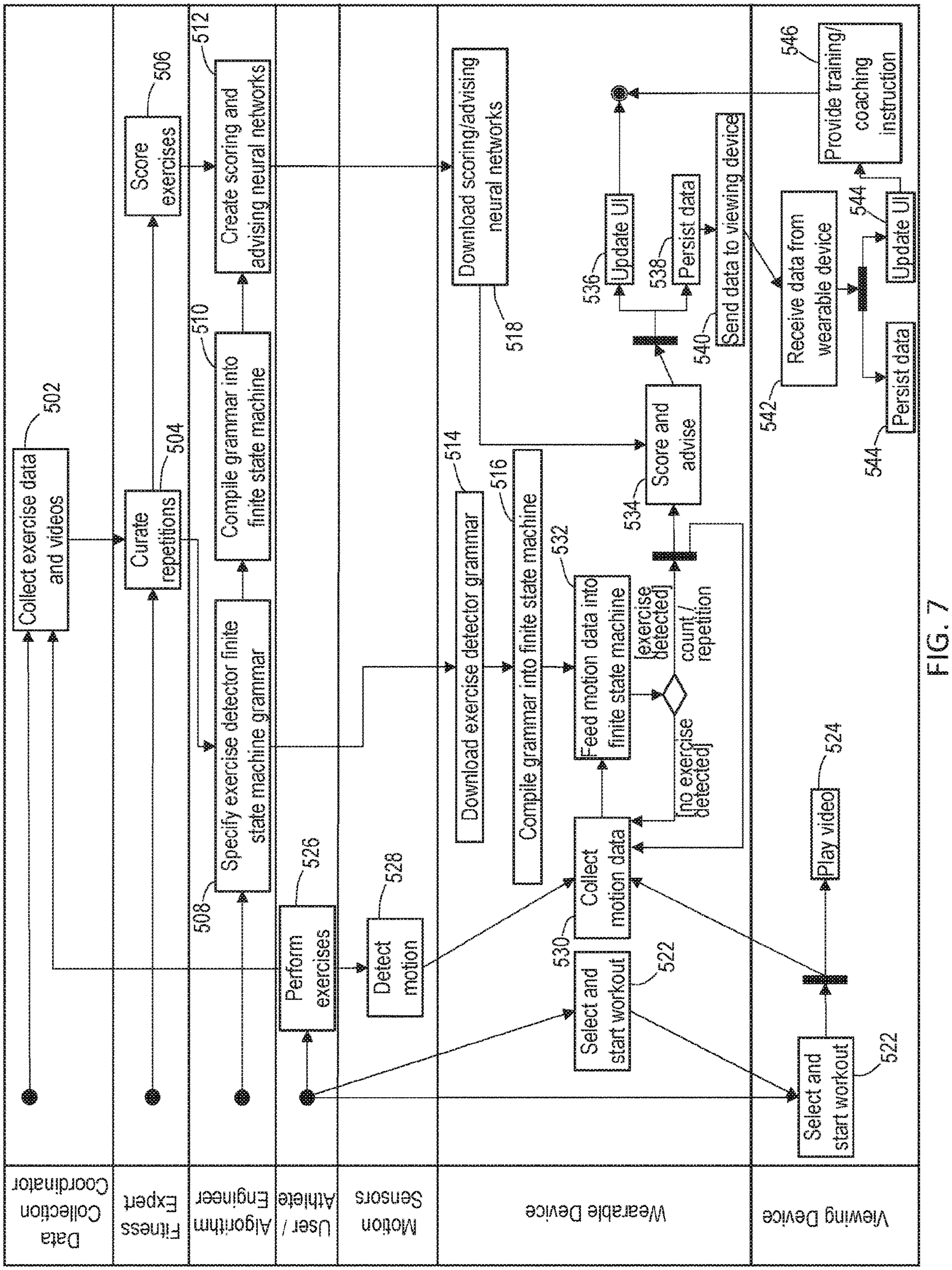
FIG. 7 is a flowchart illustrating a method of detecting repetitions of an exercise performed by a user and providing scoring and feedback to the user, according to other embodiments described herein.

FIGS. 5 and 7 illustrate embodiments for how the systems described herein recognize and analyze a user's performance of an exercise and provide feedback to that user. As shown, the exercise sequence and/or timing of exercises performed in a workout (e.g., as stored in workout database 144) is used by a finite state machine (e.g., finite state machine 152) to recognize exercises being performed by a user. Further, based on the recognition of that exercise, neural network and/or machine learning algorithms (e.g., machine learning engine 154, scoring engine 156, feedback engine 158) are used to assess the user's form, calculate a score based on that form, and/or generate feedback to be provided to the user based on the form.

For example, in some embodiments, the user's performance of an exercise is scored (i.e., judged) using an artificial neural network that is established based on an expert reviewers' (e.g., a fitness trainer) analysis of prior performance of an exercise. For example, a training user can perform a specific exercise while wearing a wearable device having one or more motion sensors. An expert reviewer can watch the user perform the exercise and provide analysis of the user's performance of the exercise (e.g., feedback on the user's form while performing the exercise). Additionally, or alternatively, the expert reviewer can provide a score or grade for the training user's performance of the exercise. For example, the expert reviewer can provide a score (e.g., on a scale of 1-10 or 1-100) or a grade (e.g., A−) that is based on the expert reviewer's judgment on how well the training user is performing the exercise. The feedback and grades/scores input by the expert reviewers can be associated with the motion data captured from the wearable devices worn by the user in one or more databases. The video of the users performing the exercise may be segmented based on the frames in which the user is performing specific repetitions of a given exercise. This may allow the feedback provided by the expert reviewer to be associated with the motion data captured for that specific repetition. The segmentation of the video may be performed manually or automatically (e.g., using image recognition and machine learning). The combination of the analysis of the motion data may serve as training data for training an artificial neural network for scoring or providing feedback to subsequent user's performing the exercise. Such a process may be performed using motion data collected from many users and multiple expert reviewers. After sufficient training data is provided, the artificial neural network can provide accurate and useful feedback to user's regarding their performance of exercises. The artificial neural network may identify patterns in motion data for user's performing an exercise that are similar to patterns of motion data for user's who were provided specific feedback or scores or grades by expert reviewers. Similar feedback or scores or grades can then be provided to the user. It should be understood that the scoring or advising of the exercises may be performed using an artificial neural network installed on the wearable device 102 (e.g., scoring engine 156) or, alternatively, can be performed by computing system 130.

Further, as shown in FIG. 1, and as described above, in various embodiments, computing environment 100 may include one or more third-party computing systems. The third-party computing systems may be able to access computing system 130 through an API. This allows such third parties to integrate the exercise recognition and analysis systems and methods described herein into their current platforms. For example, a third party, such as Beachbody, that provides pre-recorded workouts to users for streaming over the Internet may integrate the exercise recognition and analysis systems and methods described herein into their workouts. Such third parties may add the necessary workout data into workout database 144 of computing system 130. Hence, users wearing a wearable device while performing the third party's workouts may be provided the metrics and analysis described herein. In some embodiments, the feedback is overlaid on the third party's videos as the user performs the workout.

In various embodiments, the performance metrics are provided to the user in a variety of ways. For example, the number of repetitions of an exercise may be displayed. Further, in one embodiment, a bar displayed on display unit 128A indicates the level of quality (i.e., form scoring) for each repetition, as shown in FIG. 2. Additionally, or alternatively, a bar displayed on display unit 128A indicates repetition high score, low score, and average score during a set of repetitions. Further, in some embodiments, a performance score for workout execution is displayed on display unit 128A. Further, in some embodiments, cumulative workout points are displayed on display unit 128A.

In some embodiments, a performance metric may be calculated based on the user's performance of the exercises included in the guided workout. For example, a score may be calculated based on the number of repetitions performed by the user, the user's form in performing the exercises, the user's heart rate during performance of the exercises, the number of calories burned by the user and/or any other metric. In some embodiments, the user's score may be displayed on display unit 116A and/or display unit 128A. In some embodiments, the user's score may be displayed along with other user's scores on a leaderboard. The leaderboard may allow users to compare his/her performance against others performing the workout. The leaderboard may display the scores of users who performed the workout in the past. Alternatively, the leaderboard may display the scores of users performing the workout concurrently. In other embodiments, the scoreboard displays a specific user's scores for multiple instances of performing the same workout to allow the user to compare his/her performance over time.

In various embodiments, feedback is provided to the user on his/her current form and ways to improve his/her form. For example, in some embodiments, audible commands are provided to the user via viewing device 120. Additionally, or alternatively, haptic patterns are provided via wearable device 102. In addition, visual indicators may be provided on display unit 116A and/or display unit 128A.

FIGS. 2-4F show exemplary user interfaces displayed on the viewing device 120 and the wearable device 102 in accordance with embodiments described herein. FIGS. 2 and 3A show an exemplary user interface showing a guided workout on display unit 128A of viewing device 120. The display includes a user interface 200 for displaying the guided workout—for example, a video of an instructor led exercise class. The guided workout may include one or more instructors demonstrating the various exercises of the guided workout. The guided workout may also include audible cues and instructions that may be provided through a speaker of the viewing device 120 or through headphones worn by the user, for example.

The user interface 200 may further include an exercise indicator 202 indicating what exercise the user should be performing. The time during the guided workout at which the various exercises are displayed in the exercise indicator 202 may be included in the data related to the guided workout (e.g., as stored in workout database 144). This may be provided by the fitness entity that provides the guided workout. Alternatively, the exercise being performed may be identified (e.g., by a processor of the viewing device 120) based on recognition of the audio cues provided by the instructor or, alternatively or additionally, based on image recognition of the movements of the instructors in the video of the guided workout. The exercise indicator 202 may also provide an indication of the next exercise that will be performed in the guided workout to allow the user to prepare for the next exercise in advance.

The user interface 200 may further include a heart rate zone tracker 204 and a heart rate indicator 206. The heart rate zone tracker 204 and the heart rate indicator 206 may allow the user to view and track his or her heart rate while performing the guided workout to determine whether his or her heart rate is in the desired range and is at a safe level. The heart rate that is displayed may be based on a heart rate sensor worn by the user while performing the workout, for example, the wearable device 102 may include a heart rate monitor. In some embodiments, the parameters of the heart rate zone tracker 204 may be adjusted or customized for the user. For example, the upper and lower bounds of the heart rate zone tracker 204 may be based on the user's age, height, weight, fitness level, or other parameters. The heart rate zone tracker 204 may allow the user to determine if his or her level of exertion is at the desired level. A marker may be provided in the heart rate zone tracker 204 to show the user's heart rate relative to the scale.

The user interface 200 may further include a calorie burn indicator 208 that shows an estimate of the calories burned by the user during the workout. The value displayed by the calorie burn indicator 208 may be calculated using the user's heart rate as the user performs the workout. The value displayed in the calorie indicator 208 may also be based on other parameters—such as, for example, the exercises included in the workout, the user's form in performing the exercises, and various other parameters. Displaying to the user the number of calories that he or she has burned may provide additional motivation to continue the workout and to increase his or her intensity in performing the exercises of the workout.

The user interface 200 may further include a repetition count indicator 210 that displays the number of repetitions of an exercise that the user has performed, as determined using data captured by the motion sensors (e.g., sensor 119) of the wearable device 102 and a finite state machine, as described herein, for example. The display of the repetitions performed by the user may allow the user to determine if he or she has performed the number of exercises that the instructor has told the user to perform. The repetition indicator 210 may also allow the user to determine if he or she has met or exceeded a goal that he or she has set.

The user interface 200 may further include a form scoring tracker 212 and a performance score indicator 214 that may display values or metrics that provide feedback regarding the user's performance of the exercises of the workout. The values or levels displayed by the form scoring tracker 212 and performance score indicator 214 may be determined based on the motion data collected by the motion sensors (e.g., motion sensor 119) of the wearable device 102 and a neural network based scoring system, as described herein. The scores can be based on the user's form in performing the exercises and the user's pace in doing so, as described herein. The form scoring tracker 212 may be in the form of a linear bar that extends between an indication of poor form at the bottom and an indication of proper or "best" form at the top. The from scoring tracker 212 may further include a reference marker 216 that indicates the user's form score relative to the linear bar. This can provide the user with motivation to improve his or her performance of the exercise. The performance score indicator 214 can display the user's score for a particular exercise or for the user's cumulative score for the entire workout, or both.

Figure 3A:
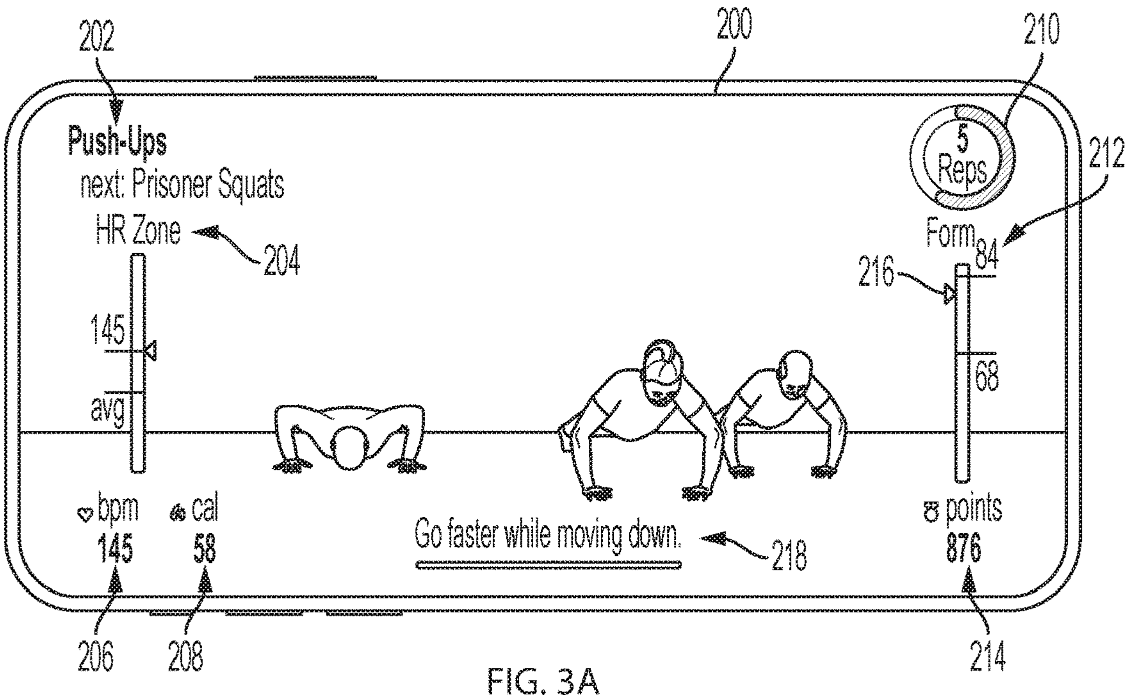
FIG. 3A is an illustration of a viewing device displaying a guided exercise routine user interface on its display unit as disclosed herein.

The user interface 200 may further include a form instruction 218. The form instruction 218 provides the user with feedback on the user's performance of the exercise. For example, the form instruction 218 can provide the text "Go Lower" when the user is performing squats. The form instruction may further include a graphical representation of the instruction for ease of understanding by the user, as shown in FIG. 2. As shown in FIG. 3A, the form instruction 218 may be in the form of text instruction such as "Go faster while moving down." when the user is performing push-ups. The proper form instruction to provide to the user may be determined based on the motion data captured by the motion sensors (e.g., motion sensor 119) of the wearable device 102 and by a neural network trained using feedback provided by fitness experts, as described herein. The real-time feedback provided by the form instruction, as well as by the form scoring tracker 212 and the performance score indicator 214, may allow the user to adjust his or her performance of the exercise to receive more benefits from performing the exercise as well as to perform the exercise in a safer manner.

Figure 3B:
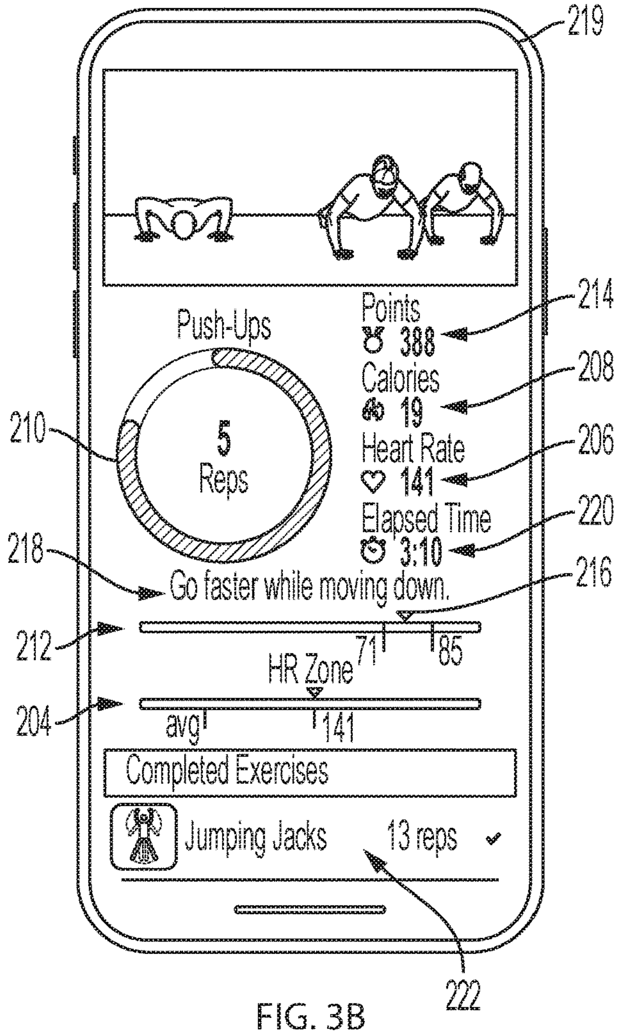
FIG. 3B is another illustration of a viewing device displaying a guided exercise routine user interface on its display unit as disclosed herein.

FIG. 3B shows an alternative exemplary user interface 219 on viewing device 120. The user interface 219 shown in FIG. 3B may be shown on the viewing device 120 when the viewing device 120 is held in portrait mode, as opposed to the user interfaces 200 of FIGS. 2 and 3A that are shown in landscape mode. As shown in FIG. 3B, the video of the instructors performing the workout may be provided in the top of the user interface 219. The exercise indicator 202, repetition count indicator 210, the heart rate zone tracker 204, the heart rate indicator 206, the calorie indicator 208, the form scoring tracker 212, and the performance score indicator 214 may be displayed below the video. The user interface 219 may further include an elapsed time indicator 220 that displays the time elapsed, either for a specific exercise or for the entire workout. The user interface 219 may further include a list 222 showing the exercises performed during the workout along with the number of repetitions of the exercise performed.

Figure 3C:
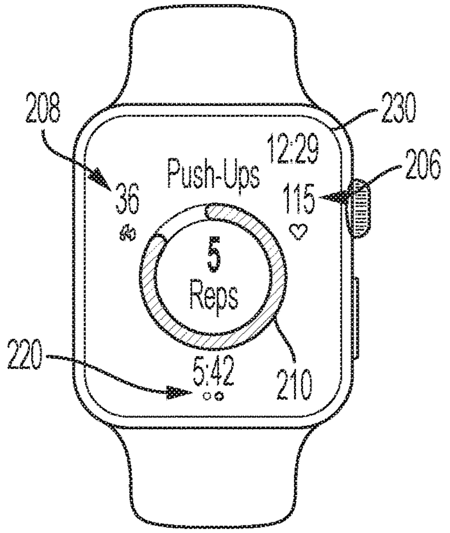
FIG. 3C is an illustration of a wearable device displaying a guided exercise routine user interface as described herein.

As shown in FIG. 3C, a user interface 230 may be provided on the wearable device 102. The user interface 230 may provide the same or a subset of the information provided on the user interfaces 200, 219 described above. For example, the user interface 230 may include the repetition count indicator 210, the heart rate indicator 206, the calorie indicator 208, and the elapsed time indicator 220. It should be understood that additional or alternative information may be provided on the user interface 230 on the wearable device 102. For example, the form scoring tracker 212 or the performance score indicator 214 may be provided on the user interface 230.

Figure 4B:
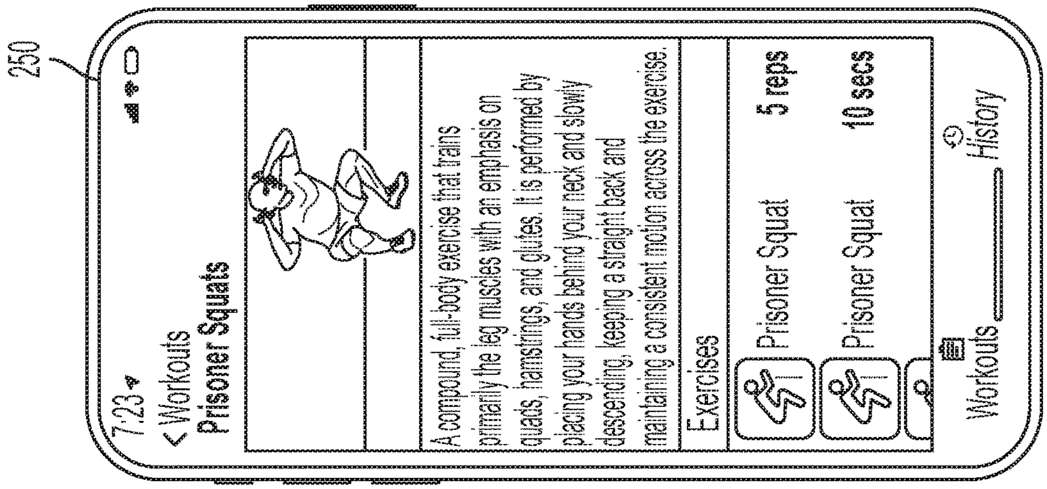
FIG. 4B is an illustration of a viewing device displaying a workout detail user interface as described herein.
Figure 4A:
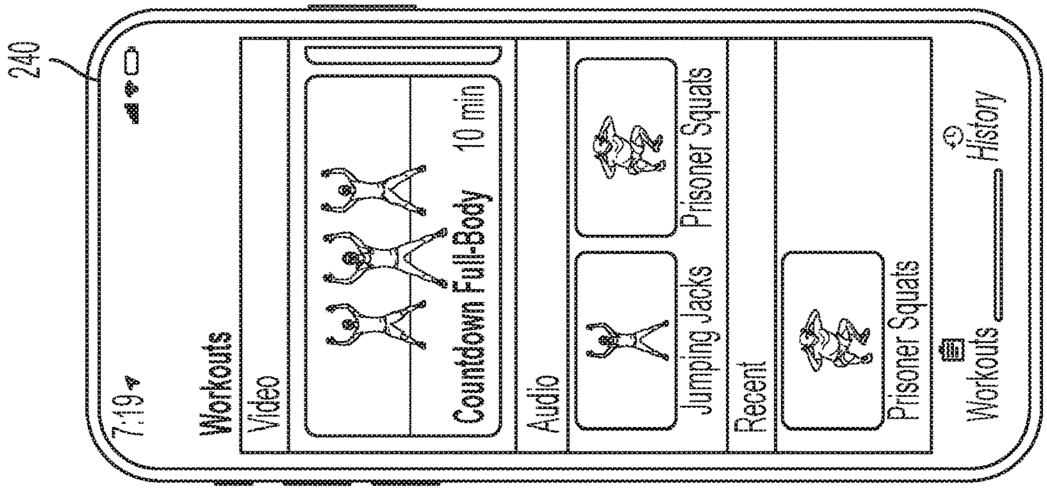
FIG. 4A is an illustration of a viewing device displaying a guided exercise routine selection user interface as described herein.
Figure 4F:
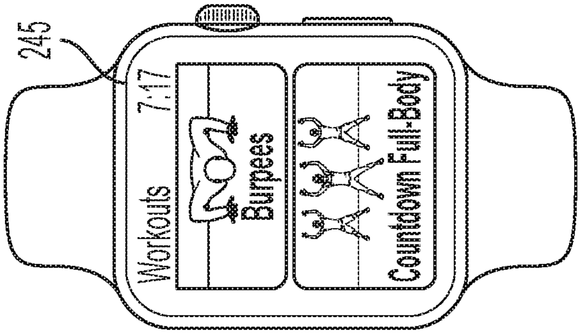
FIG. 4F is an illustration of a wearable device displaying a guided exercise routine selection user interface as described herein.
Figure 4E:
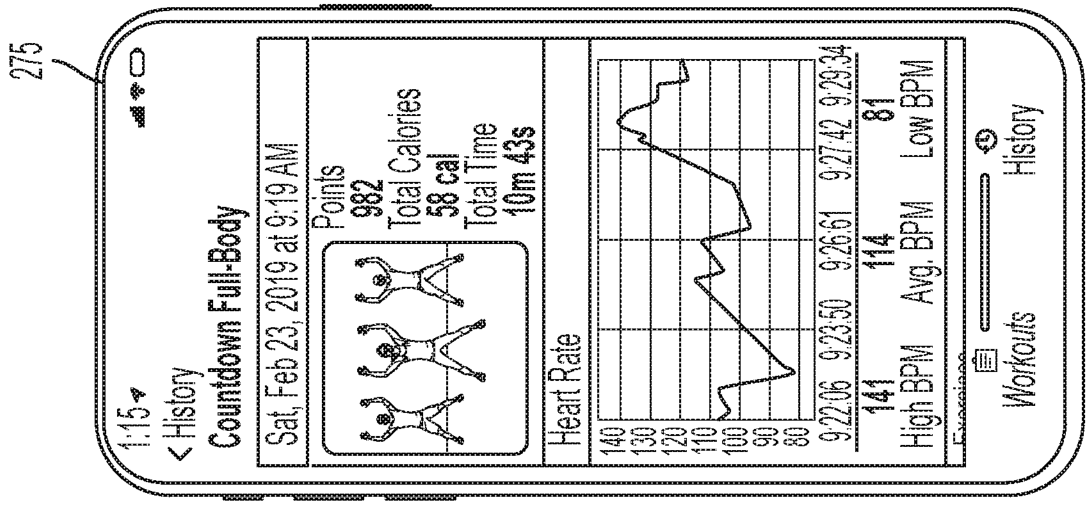
FIGS. 4D and 4E are illustrations of a viewing device displaying a workout summary user interfaces as described herein.
Figure 4D:
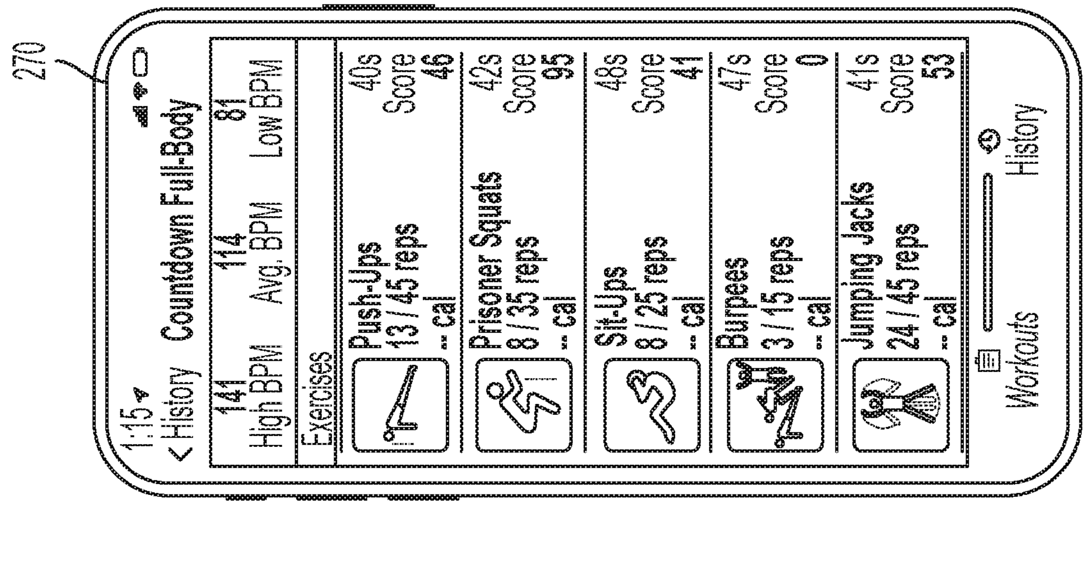

FIGS. 4A-4E show various user interfaces that may be provided on the viewing device 120 in association with the systems and methods described herein. FIG. 4A shows a workout selection user interface 240. The workout selection user interface 240 allows a user to select from various workouts available to the user, e.g., those stored in workout database 144. The workouts can include pre-recorded or live-streamed video workouts. Additionally, or alternatively, the available workouts can include audio-only workouts that include audio based instructions that guide the user through the workout. Such audio workouts can be particularly useful when the user is performing the workout in a public gym or outdoors. FIG. 4F shows a workout selection user interface 245 provided on a wearable device 102. The workout selection user interface 245 may provide similar information as the workout selection user interface 240, but may be adapted for the smaller screen of the wearable device 102.

FIG. 4B shows a workout detail user interface 250. The workout detail user interface 250 may be accessed by selecting one of the workouts provided on workout selection user interface 240. The workout detail user interface 250 may provide a description of the workout, a list of exercises performed during the workout, muscles targeted during the workout, the level of cardio exertion experienced during the workout, and any other information regarding the workout.

FIG. 4C shows a workout history user interface 260 that provides information regarding workouts that the user has performed. The information provided on workout history user interface 260 can include, for example, the number of workouts performed, the total calories burned, the total time that the user has been engaged in performing exercises, and the total performance points the user has accumulated while performing workouts. The user interface 260 can further include a list of workouts completed by the user along with certain information related to each workout, such as an estimate of the number of calories burned by the user and the performance score points that the user earned while performing the workout.

FIGS. 4D and 4E show workout performance user interfaces 270, 275 that provide details regarding a specific workout the user has performed. The workout performance user interfaces 270, 275 may be accessed by selecting one of the workouts provided on the workout history user interface 260. As shown in FIG. 4D, the workout performance user interface 270 can provide information such as the maximum, average, and low heart rate of the user during performance of the workout. The workout performance user interface 270 can further provide a list of exercises performed during the workout, the number of repetitions of each performed, the number of estimated calories burned, the duration of the exercise, and the performance score points earned. The user interface 275 can provide additional information or provide the information in a different way. For example, user interface 265 can provide a graph of the user's heart rate vs. time during performance of the workout.

The methods described herein are further illustrated in the accompanying drawings, for example in FIGS. 5-8. FIG. 5 shows a flowchart illustrating initiation of a workout, identification of the performance of the exercises associated with the workout, and the determination of a performance score for the user. While FIG. 5 illustrates certain steps being performed by certain devices (e.g., the wearable device or the viewing device), it should be understood that steps illustrated as being performed by the wearable device can alternatively, or additionally, be performed by the viewing device. Additionally, certain steps can be performed by a cloud based computing system.

At block 302, the system receives input from a user selecting a workout to perform. The user can select the workout using either the wearable device 102 or the viewing device 120. The selection may be in the form of selection of a workout displayed on a screen of the wearable device 102 or the viewing device 120 (see FIGS. 4A and 4F) or may be, for example, a voice command. Upon selection of the workout, at block 304, the viewing device begins playing the guided workout. As described above, the guided workout may be in the form of a video (recorded or live-streamed), audio instructions, or text instructions. The viewing device may pull the workout data (e.g., the video, audio instructions, ordered list of workouts, etc.) from the computing system 130 (e.g., workout database 144).

Once the workout begins, at block 306, the user begins performing exercises in accordance with instructions provided with the workout. Further, at block 308, the motion sensors (e.g., sensor 119) of the wearable device begin detecting motion and collecting motion data. As described herein, the motion sensors can include, for example, accelerometers and gyroscopes. The motion sensors can be located in a single wearable device (e.g., an Apple iWatch) or may be located at various positions on the user's body (e.g., wrist, head, ankle, etc.).

At block 310, the wearable device 102 collects the motion data from the motion sensors. The motion data may be stored locally in memory of the wearable device 102 or stored in a cloud-based storage system. At block 312, the motion data is fed into a finite state machine for evaluation and detection of repetitions of exercises, as described herein. If no exercise is detected using the finite state machine, no count or repetition is counted. If the finite state machine determines that the user has performed a repetition, a repetition is counted. The repetition count provided to the user can be updated (e.g., the repetition count indicator 210 shown in FIG. 2). The finite state machine analysis may be performed by a processor of the wearable device 102, a processor of the viewing device 120, or by a cloud based computing system, for example.

Further, when a repetition is identified, at block 314, the motion data is analyzed to determine event markers. The event markers are described in further detail herein, but may include, for example, changes in direction of the user determined based on the motion data and event markers such as minimums, maximums, up crosses of a certain value, down crosses of a certain value, and motion features with conditions within limiting boundaries. At block 316, various measurements are calculated based on the motion data. These measurements may include, for example, the acceleration of movement of the user and the extent of movement of the user (e.g., the depth of movement during a squat).

At block 318, the form score and points are calculated based on the motion data. As described herein, the form score and points may be calculated using an artificial neural network that has been trained using training data that is based on expert reviewers (e.g., fitness trainers) providing feedback based on reviewing training users performing the same exercise. The expert reviewer's input regarding form score and changes to be made to the form can be matched up with the motion data captured by wearable sensors worn by the training user to serve as training data to train the neural network.

At block 320, the user interface (i.e., on display unit 116A) of the wearable device 102 may be updated to provide the user with the updated repetition count, updated heart rate information, updated estimated calories burned, as well as the performance score. In addition, at block 322, this data may be stored in memory of the wearable device 102. Alternatively, the data may be uploaded to a cloud based storage system. At block 324, the data is sent to the viewing device and at block 326 the data is received by the viewing device. At block 328, the data is stored in the memory of the viewing device 120. At block 330, the user interface (e.g., on display unit 128A) of the viewing device is updated to provide the user with the updated repetition count, updated heart rate information, updated estimated calories burned, as well as the performance score. At block 332, training instruction is provided to the user via the viewing device 120. For example, feedback can be provided to the user via form instruction 218 (shown in FIGS. 2 and 3A) to instruct the user on how to improve his or her form in performing the exercise. The workout results may also be sent to computing system 130 for storage in a database of computing system 130.

FIG. 6 is a flowchart illustrating the use of a finite state machine to identify repetitions of an exercise being performed by a user. At block 402, data is read from the motion sensors. As described above, the motion sensors can include, for example, accelerometers and gyroscopes. The motion data can include, for example, accelerations, rotations, etc. At block 404, the raw sensor data is translated into unitized values and, at block 406, the unitized values are oriented based on gravitational orientation. Based on the unitized values that are oriented to gravity, at block 408, higher-order values are derived. These higher-order values can include, for example, velocity (based on integration of acceleration data received from the motion sensors), position (based on integration of the velocity), and slope (for example, the slope of a graph of the acceleration data).

At block 410, the motion data is monitored to identify whether the user has begun performing an exercise. If, based on the motion data, the start of the exercise is not detected, the processor continues to monitor the data to determine when the user begins performing the exercise.

Once the processor determines that the exercise has begun, at blocks 412, 414, 416, the finite state machine looks for the translation between various repetition states in the motion data. The state transitions may be detected using a combination of the following conditions, for example, (i) detection of a value reaching a local maximum or minimum; (ii) detection of a slope (i.e., a first-order derivative of a set of values) exceeding a minimum or maximum for a number of samples of the motion data; (iii) a series of values remaining in a range or breaking out of a range for a minimum number of samples; (iv) a value crossing a threshold (e.g., 0); (v) one value crossing another value; and (vi) the number of samples in a state exceeding a minimum or maximum count. These conditions may be related to the specific exercise being performed by the user (based on the guided exercise routine) and can be determined based on data collected from users who have previously performed the exercise. If any of the repetition states are not met, the repetition is not added to the repetition count. If each of the repetitions are identified in the motion data, at block 418, an event marker is created (i.e., the number of repetitions performed is incremented by one).

At block 420, measurements related to the user's performance of the exercise are calculated. This may include calculating an estimate for the number of calories burned by the user, the user's heart rate during performance of the exercise, etc. At block 422, the user's form score is calculated. As described herein, the form score for the repetition may be calculated using a neural network that is trained using feedback provided by a fitness expert (e.g., fitness trainer) reviewing a video of a training user performing the exercise and motion data captured from a wearable device worn by the training user. At block 424, points are assigned to the user based on the score calculated at block 422. A cumulative score for all of the repetitions of that exercise as well as a cumulative score for the entire workout may be calculated.

FIG. 7 provides another flowchart illustrating the identification and scoring of the performance of exercises according to embodiments described herein. FIG. 7 provides additional detail on the training of the neural network and finite state machine by a fitness expert such as a fitness trainer. In many aspects, the processes illustrated in FIG. 7 may be similar to those illustrated in FIG. 5 and described above.

At block 502, motion data and videos of user's performing exercises are collected. Such motion data and videos may be of pre-selected training users or may be regular users of the platform. These videos are provided to fitness experts, such as fitness trainers, for review. The videos may be segmented before being provided to the fitness experts. Such segmentation may separate the video based on frames into segments for each repetition performed by the user. This may allow the information provided by the fitness experts to be correlated with the motion data captured for that specific repetition. The segmentation may be done manually or may be done automatically (e.g., using image recognition and machine learning). At block 504, the fitness expert reviews the videos and identifies when the user has completed a proper or acceptable repetition of the exercise. As described in more detail below, the fitness expert's determinations, in combination with the associated motion data from the user, can be used to train the finite state machine to automatically identify the completion of a repetition by subsequent users.

At block 506, the fitness expert provides a score for the user's performance of the exercise. For example, the fitness expert may provide a higher score for a user that performs the exercise with perfect form, while providing a lower score for a user that performs the exercise with poor form. The score can be provided on any desired scale (e.g., 1-10, 1-100, etc.). Further, the fitness expert may also provide feedback regarding the user's form, such as, for example, that the user did not go low enough when performing a squat or that the user was moving too quickly or slowly. As described further herein, the scoring and feedback provided by the expert reviewer is used, in conjunction with the motion data collected from the user while performing the exercise, to train a neural network to provide scoring and feedback to subsequent users of the platform.

At block 508, finite state machine grammar is specified (e.g., by an algorithm engineer). The finite state machine grammar may be determined, at least in part, on identification of the repetitions by the fitness expert. At block 510, the grammar is compiled into the finite state machine (e.g., by an application engineer). At block 512, the scoring and advising neural networks are created (e.g., by an application engineer). The scoring and advising neural networks may be based, at least in part, on the exercise scoring and feedback provided by the fitness experts, as well as the finite state machine grammar.

At block 514, the exercise detection grammar may be downloaded by the wearable device and, at block 516 the grammar may be compiled into the finite state machine. At block 518, the scoring and advising neural networks are downloaded to the wearable device 102.

The performance of the exercise recognition and scoring may follow a similar process as described above with reference to FIG. 5. For example, at block 522, a user may select and start a workout. As noted above, the user may select a workout on either the wearable device or the viewing device—for example, by touching a touch screen input unit or by using a voice command. As noted, the guided workout may be in the form of a guided video workout (pre-recorded or live streamed) or can be in the form of audio or text instructions. At step 524, the viewing device displays the guided workout. For example, the viewing device may play a video of the guided workout. The viewing device may download the guided workout from the workout database 144 of the computing system 130. At step 526, the user begins performing the workout while wearing the wearable device.

At block 528, the motion sensors of the wearable device detect motion of the user. As noted above, the motion sensors can include accelerometers, gyroscopes, etc. The motion sensors may be incorporated in a wearable device, such as an Apple iWatch. The motion sensors can also include other motion sensors of a device mounted on the user's head, chest, ankle, etc. which may be communicably coupled to one another and/or to the viewing device 120.

At block 530, the motion data from the motion sensors is collected by the wearable device 102. At block 532, the motion data is fed into the finite state machine. The finite state machine is used to determine when the user has completed a repetition of the exercise, as described herein. If the finite state machine does not detect the repetition of the exercise, motion data continues to be fed to the finite state machine. When the finite state machine detects the performance of a repetition, at block 534, a performance score and advice for the user is determined using the neural network, which may be trained using the input of the expert reviewers, as described herein. At block 536, the user interface (i.e., on the display unit 116A) of the wearable device 102 is updated. For example, the repetition count may be updated, the performance score indicator may be updated, the estimated calories burned may be updated, etc. At block 538, the scoring data, repetition data, etc. is stored in the memory of the wearable device 102. At block 540, the data is sent to the viewing device.

At block 542, the data is received by the wearable device. At block 544, the data is stored in the memory of the viewing device 120. At block 546, the user interface of the viewing device (i.e., on display unit 128A) is updated. For example, the repetition count, the performance score, the calories burned, and heart rate may be updated on the display of the viewing device. At 546, training and coaching instruction may be provided to the user, as determined using the neural network. For example, the neural network may determine that the user should be instructed to go lower when performing a squat. This instruction may be provided to the user in the form of textual or graphical instructions on the viewing device or the wearable device. Additionally, or alternatively, tactile feedback may be provided to the user via the wearable device. For example, the wearable device may vibrate to indicate to the user that he or she should speed up or slow down.

FIG. 8 provides another flowchart illustrating a process of detecting repetitions of an exercise and providing feedback and scoring to a user. In many aspects, the process illustrated in FIG. 8 is similar to that described above with reference to FIG. 6. At block 602 data from the motion sensors is read. As described herein, the motion data may be read by a processor of the wearable device, a processor of the viewing device, or the motion data may be read by a cloud based processing system. As described above, the motion sensors can include, for example, accelerometers and gyroscopes. The motion data can include, for example, accelerations, rotations, etc. At block 604, the raw sensor data is translated into unitized values and, at block 606, the unitized values are oriented based on gravitational orientation. Based on the unitized values that are oriented to gravity, at block 608, higher-order values are derived. These higher-order values can include, for example, velocity (based on integration of acceleration data received from the motion sensors), position (based on integration of the velocity), and slope (for example, the slope of a graph of the acceleration data).

At block 610, the motion data is monitored to identify whether the user has begun performing an exercise. For example, the motion data is monitored using the finite state machine to identify motion data that indicates repetition state 0 or the beginning of the repetition. If, based on the motion data, the start of the exercise is not detected, the processor continues to monitor the data to determine when the user begins performing the exercise.

Once the processor determines that the exercise has begun, at blocks 412, 414, 416, the finite state machine looks for the translation between various repetition states in the motion data. The state transitions may be detected using a combination of the following conditions, for example, (i) detection of a value reaching a local maximum or minimum; (ii) detection of a slope (i.e., a first-order derivative of a set of values) exceeding a minimum or maximum for a number of samples of the motion data; (iii) a series of values remaining in a range or breaking out of a range for a minimum number of samples; (iv) a value crossing a threshold (e.g., 0); (v) one value crossing another value; and (vi) the number of samples in a state exceeding a minimum or maximum count. If any of the repetition states are not met, the repetition is not added to the repetition count. If each of the repetitions are identified in the motion data, at block 418, repetition data is updated and provided to the scoring and advising models (i.e., the number of repetitions performed is incremented by one). At each step of identifying repetition states (e.g., blocks 612, 614, 616) the finite state machine may review the data for both local and global conditions. The local conditions may be specific to each repetition state of the exercise, while the global conditions may apply to each of the repetition states of the exercise. At each step of identifying repetition states, the failure of the motion data to satisfy the relevant local conditions or one of the global conditions may result in the finite state machine determining that a repetition has not been completed. In order for the repetition to be counted, all local conditions in each repetition state must be satisfied and all global conditions must be satisfied throughout the performance of the repetition. For example, when the user is performing a push-up, a global condition may be defined based on movement of the user's hand or wrist. In other words, a significant movement of one of the user's hands may indicate that the user is no longer performing push-ups, resulting in a failure of the global condition and a repetition not being counted. This may occur at any stage of a repetition (e.g., during the downward or upward movement). Examples, of local conditions for a user performing a push-up include specific movement (e.g., position, acceleration) of the user's wrist during a specific phase of the exercise (e.g., downward movement, transition between downward and upward movement, etc.).

At block 616, the repetition data is provided to the advising and scoring models (e.g., scoring engine 156 and feedback engine 158). At block 618, the user's form score is calculated and any applicable feedback or advice to be provided to the user is identified. As described herein, the form score for the repetition and the feedback or advice may be calculated using a neural network that is trained using feedback provided by a fitness expert (e.g., fitness trainer) reviewing a video of a training user performing the exercise and motion data captured from a wearable device worn by the training user. At block 620, points are assigned to the user based on the score calculated at block 618. A cumulative score for all of the repetitions of that exercise as well as a cumulative score for the entire workout may be calculated.

Figure 9:
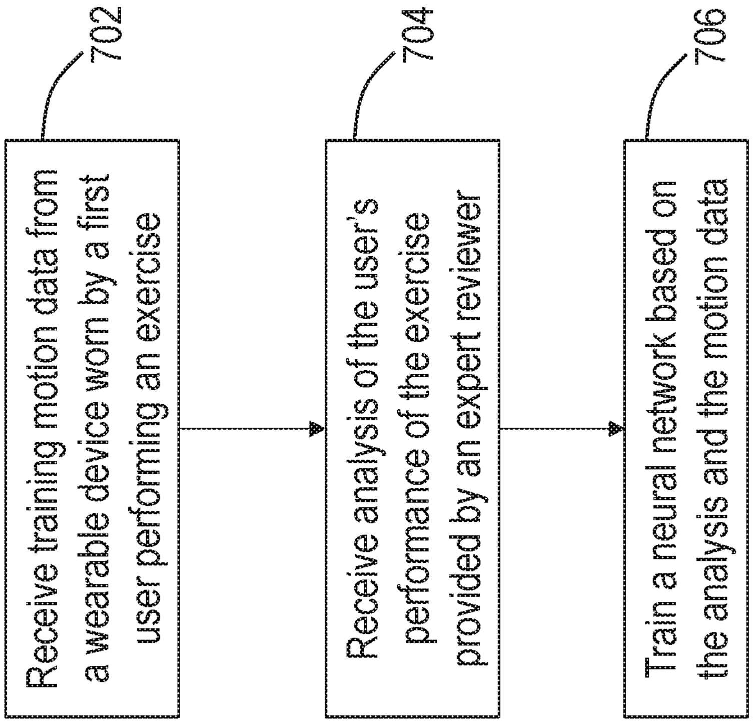
FIG. 9 is a flowchart illustrating a method of training a neural network as disclosed herein.

FIG. 9 illustrates a method of training an artificial neural network. At step 702, training motion data is received from a wearable device worn by a training user. The training motion data is captured by the wearable device while the training user is performing an exercise. The wearable device may be, for example, a smart watch—such as, for example, an Apple iWatch. The wearable device may, alternatively, be a device worn around the chest, leg, or other part of the user's body. The motion data may include, for example, data captured by accelerometers or gyroscopes. At block 522, the motion data from the motion sensors is collected by the wearable device 102.

At step 704, analysis of the user's performance of the exercise is received. The analysis may be provided by an expert reviewer (e.g., a fitness trainer) that watches the user perform the exercise. The expert reviewer may watch the user perform the exercise in person or may watch a recording of the user perform the exercise. The analysis can include, for example, feedback on the user's performance of the exercise, such as on the user's form during performance of the exercise (e.g., the user is not keeping her chest up). The analysis may further include a score or grade. For example, the expert reviewer may provide a score (e.g., on a scale of 0-100 or 0-10) that corresponds to how well the user is performing the exercise (e.g., with higher scores being better). Alternatively, the expert reviewer may provide a grade (e.g., B+) that corresponds to how well the user is performing the exercise.

At step 706, an artificial neural network is trained based on the training motion data and the analysis received by the expert reviewer. The training motion data and the expert reviewer analysis may be associated with one another in a database and used as part of a training dataset for the artificial neural network. The training of the neural network algorithms can be supervised or unsupervised, for example. The artificial neural network may be used to determine a score or appropriate feedback to a user who later performs the exercised based on motion data captured by motion sensors of a wearable device worn by the user, as described in further detail below.

Figure 10:
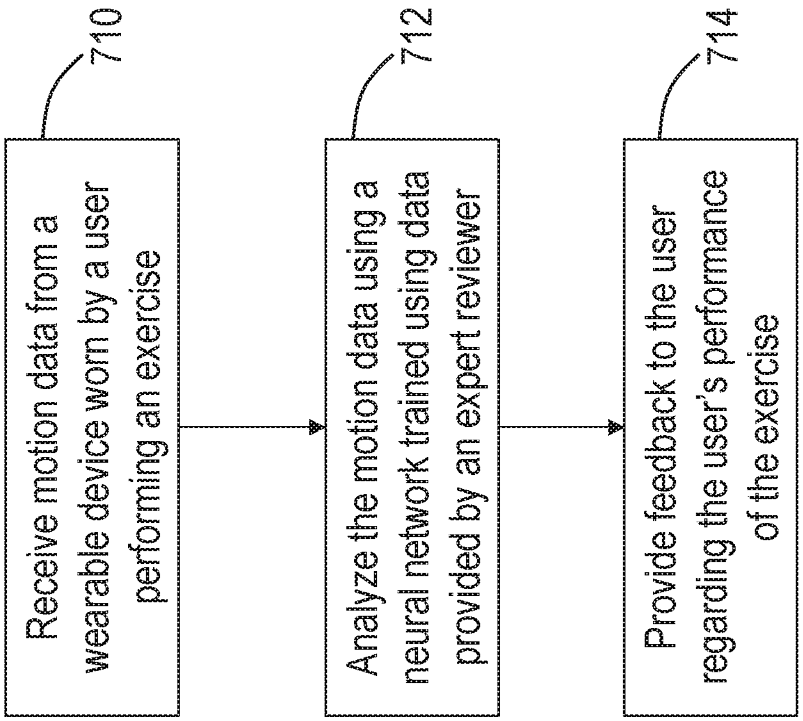
FIG. 10 is a flowchart illustrating a method of providing feedback to a user as disclosed herein.

FIG. 10 illustrates a method for providing feedback to a user performing an exercise. At step 710, motion data is received from a wearable device worn by the user. The motion data is captured by the wearable device while the user is performing an exercise. The wearable device may be, for example, a smart watch—such as, for example, an Apple iWatch. The wearable device may, alternatively, be a device worn around the chest, leg, or other part of the user's body. The motion data may include, for example, data captured by accelerometers or gyroscopes.

At step 712, the motion data is analyzed using an artificial neural network trained using data provided by an expert reviewer, for example, as described above with respect to FIG. 9. The analysis may be performed locally (e.g., by the wearable device or the user's mobile device (such as a smart phone)). Alternatively, the analysis may be performed by a remote server.

At step 714, feedback is provided to the user regarding the user's performance of the exercise. The feedback is based on the analysis performed at step 712. The feedback may be, for example, a score or grade of the user's performance of the exercise. Additionally, or alternatively, the feedback may include instructions to the user on how the user can improve her form when performing the exercise.

Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

What is claimed is:

1. A method by at least one processor configured to execute instructions that, when executed, cause the at least one processor to carry out the method, the method comprising:

training a machine learning model to score at least one exercise, wherein the machine learning model is trained using a training dataset including data representative of a plurality of prior performances of the at least one exercise, a performance score associated with each of the prior performances in the plurality of the prior performances, and prior motion data associated each of the prior performances in the plurality of prior performances;

receiving real-time motion data from at least one motion sensor that a user is wearing while the user is performing the at least one exercise;

generating adjusted motion data by automatically orienting the motion data to gravity;

automatically determining that the real-time motion data corresponds to the at least one exercise based, at least in part, on one of the real-time motion data or the adjusted motion data;

executing a finite state machine that receives the adjusted motion data and signature data of the at least one exercise as an input, wherein the finite state machine includes a finite state machine grammar based at least in part on the prior motion data of the training dataset;

generating, by the finite state machine, repetition data identifying one or more repetitions of the at least one exercise performed by the user by determining at least one value of the adjusted motion data crosses at least one corresponding value of the signature data of the at least one exercise, and wherein the finite state machine implements a state transition response to the determination, wherein each repetition is identified based on one or more event markers that each correspond to at least one data point in the adjusted motion data;

inputting the adjusted motion data and the signature data for the one or more repetitions of the at least one exercise to the trained machine learning model, wherein the trained machine learning model outputs performance data characterizing a performance score for performance of the at least one exercise;

inputting the repetition data and the performance data to an artificial neural network that generates feedback data regarding a form of each repetition of the at least one exercise; and transmitting the feedback data and the performance score to a user device of the user for display within a digital interface.

2. The method of claim 1, comprising:

prior to receiving the real-time motion data, receiving, from the user device, selection data characterizing a selection of a guided exercise routine from a plurality of available guided exercise routines for display within the digital interface of the user device, wherein the guided exercise routine includes the at least one exercise; and determining the signature data characterizing the at least one exercise based on the received selection data.

3. The method of claim 1, the method wherein the training data includes a plurality of training videos each including a training user performing the at least one exercise and associated with a corresponding performance score.

4. The method of claim 2, wherein identifying the one or more repetitions is further based on the guided exercise routine.

5. The method of claim 2, wherein the guided exercise routine includes a plurality of exercises.

6. The method of claim 5, wherein the guided exercise routine comprises an ordered sequence of the plurality of exercises, and the method further comprises:

identifying the at least one exercise based at least in part on the ordered sequence of the plurality of exercises.

7. The method of claim 1, comprising:

providing digital and audio content corresponding to the at least one exercise via the digital interface prior to receiving the real-time motion data.

8. The method of claim 1, wherein the training dataset is generated based on one or more expert reviews of videos of one or more training users performing the at least one exercise.

9. The method of claim 8, wherein the feedback data comprises suggested modifications to a form of the at least one exercise.

10. The method of claim 1, wherein the real-time motion data is received from at least one accelerometer and at least one gyroscope.

11. The method of claim 1, comprising training the artificial neural network based on motion training data and corresponding feedback training data.

12. The method of claim 1, wherein automatically determining that the real-time motion data corresponds to the at least one exercise includes identifying the at least one exercise in a guided exercise routine based on voice recognition of audio cues in the guided exercise routine, image recognition techniques of images in the guided exercise routine, or a combination thereof.

13. A system comprising:

a memory storing instructions; and a processor communicatively coupled to the memory and configured to execute the instructions to:

train a machine learning model to score at least one exercise, wherein the machine learning model is trained using a training dataset including data representative of a plurality of prior performances of the at least one exercise, a performance score associated with each of the prior performances in the plurality of the prior performances, and prior motion data associated each of the prior performances in the plurality of prior performances;

receive real-time motion data from at least one motion sensor that a user is wearing while the user is performing the at least one exercise;

generate adjusted motion data by orienting the motion data to gravity;

automatically determining that the real-time motion data corresponds to the at least one exercise based, at least in part, on one of the real-time motion data or the adjusted motion data;

execute a finite state machine that receives the adjusted motion data and signature data—of the at least one exercise as an input, wherein the finite state machine includes a finite state machine grammar based at least in part on the prior motion data of the training dataset;

generate, by the finite state machine, repetition data identifying one or more repetitions of the at least one exercise performed by the user by determining at least one value of the adjusted motion data crosses at least one corresponding value of the signature data of the at least one exercise, and wherein the finite state machine implements a state transition response to the determination, wherein each repetition is identified based on one or more event markers that each correspond to at least one data point in the adjusted motion data;

input the adjusted motion data and the signature data for the one or more repetitions of the at least one exercise to the trained machine learning model, wherein the trained machine learning model outputs performance data characterizing a performance score for-performance of the at least one exercise;

input the repetition data and the performance data to an artificial neural network that generates feedback data regarding a form of each repetition of the at least one exercise; and transmit the feedback data and the performance score to a user device of the user for display within a digital interface.

14. The system of claim 13, wherein training data that includes a plurality of training videos each including a training user performing the at least one exercise and associated with a performance score.

15. The system of claim 13, wherein a guided exercise routine comprises an ordered sequence of a plurality of exercises including the at least one exercise, and wherein determining the real-time motion data corresponds to the at least one exercise is based at least in part on the ordered sequence of the plurality of exercises.

16. The system of claim 13, wherein the feedback data comprises suggested modifications to a form of the at least one exercise.

17. The system of claim 13, wherein the processor executes the instructions to train the artificial neural network based on motion training data and corresponding feedback training data.

18. A non-transitory computer readable medium having program instructions stored thereon, the program instructions executable by one or more processors that cause a device to perform operations comprising:

training a machine learning model to score at least one exercise, wherein the machine learning model is trained using a training dataset including data representative of a plurality of prior performances of the at least one exercise, a performance score associated with each of the prior performances in the plurality of the prior performances, and prior motion data associated each of the prior performances in the plurality of prior performances;

receiving real-time motion data from at least one motion sensor that a user is wearing while the user is performing the at least one exercise;

generating adjusted motion data by orienting the motion data to gravity;

automatically determining that the real-time motion data corresponds to the at least one exercise based, at least in part, on one of the real-time motion data or the adjusted motion data;

executing a finite state machine that receives the adjusted motion data and signature data—of the at least one exercise as an input, wherein the finite state machine includes a finite state machine grammar based at least in part on the prior motion data of the training dataset;

generating, by the finite state machine, repetition data identifying one or more repetitions of the at least one exercise performed by the user by determining at least one value of the adjusted motion data crosses at least one corresponding value of the signature data of the at least one exercise, and wherein the finite state machine implements a state transition response to the determination, wherein each repetition is identified based on one or more event markers that each correspond to at least one data point in the adjusted motion data;

inputting the adjusted motion data and the signature data for the one or more repetitions of the at least one exercise to the trained machine learning model, wherein the trained machine learning model outputs performance data characterizing a performance score for performance of the at least one exercise;

inputting the repetition data and the performance data to an artificial neural network that generates feedback data regarding a form of each repetition of the at least one exercise; and transmitting the feedback data and the performance score to a user device of the user for display within a digital interface.

19. The non-transitory computer readable medium of claim 18, wherein the program instructions cause the device to perform operations comprising training the artificial neural network based on motion training data and corresponding feedback training data.

20. The non-transitory computer readable medium of claim 18, wherein the training data that includes a plurality of training videos each including a training user performing the at least one exercise and associated with a performance score.

* * * * *